United States Patent
Otsuka et al.

(10) Patent No.: US 12,162,985 B2
(45) Date of Patent: *Dec. 10, 2024

(54) POLYAMIDE RESIN

(71) Applicant: Mitsubishi Gas Chemical Company, Inc., Tokyo (JP)

(72) Inventors: Kosuke Otsuka, Hiratsuka (JP); Yuya Okajima, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/021,796

(22) PCT Filed: Jun. 9, 2021

(86) PCT No.: PCT/JP2021/021854
§ 371 (c)(1),
(2) Date: Feb. 16, 2023

(87) PCT Pub. No.: WO2022/038864
PCT Pub. Date: Feb. 24, 2022

(65) Prior Publication Data
US 2023/0227608 A1    Jul. 20, 2023

(30) Foreign Application Priority Data

Aug. 20, 2020  (JP) .................. 2020-139069

(51) Int. Cl.
C08G 69/26 (2006.01)
(52) U.S. Cl.
CPC .................. C08G 69/26 (2013.01)
(58) Field of Classification Search
None
See application file for complete search history.

(56) References Cited

U.S. PATENT DOCUMENTS

| | | | |
|---|---|---|---|
| 2,464,693 A | 3/1949 | Kirk, Jr. et al. | |
| 3,335,114 A * | 8/1967 | Huffman | C08G 69/26 528/346 |
| 3,563,959 A | 2/1971 | Schade et al. | |
| 4,451,642 A | 5/1984 | Frazer et al. | |
| 2003/0229102 A1 | 12/2003 | Knobelsdorf et al. | |
| 2019/0055356 A1 | 2/2019 | Aepli et al. | |
| 2020/0270453 A1 | 8/2020 | Miyabe et al. | |

FOREIGN PATENT DOCUMENTS

| | | |
|---|---|---|
| CN | 102702510 A | 10/2012 |
| CN | 106279905 A | 1/2017 |
| CN | 106810690 A | 6/2017 |
| CN | 111094456 A | 5/2020 |
| CN | 115956097 A | 4/2023 |
| EP | 4159788 A1 | 4/2023 |
| JP | 44-19268 B1 | 8/1969 |
| JP | S44-19268 B1 | 8/1969 |
| JP | S62-54725 A | 3/1987 |
| JP | H08-3312 A | 1/1996 |
| JP | 2004-503527 A | 2/2004 |
| WO | 01/96289 A1 | 12/2001 |

OTHER PUBLICATIONS

Ullmann's Polymers and Plastics: Products and Processes (2016 Wiley-VCH Verlag GmbH & Co. KGaA, Weinheim, "Polyamides," pp. 697-728) (Year: 2016).*
International Search Report and Written Opinion for PCT/JP2021/021854, with English translation of the International Search Report, mailed Jul. 20, 2021 (10 pages).
CNIPA; Application No. 202180050415.8; Office Action dated May 27, 2023, 6 pages.
CNIPA; Application No. 202180050334.8; Office Action dated May 19, 2023, 5 pages.
Dolden, "Structure-property relationships in amorphous polyamides," Polymer, 1976, vol. 17 (Oct. 1976), pp. 875-892.
International Search Report and Written Opinion for PCT/JP2021/021855, with English translation of the International Search Report, mailed Jul. 20, 2021 (10 pages).
EPO; Application No. 21858015.7; Extended European Search Report dated Jan. 15, 2024, 12 pages.
Manescalchi et al., "Partially Aromatic Polyamides: A Calorimetric and Dynamic-Mechanical Investigation" Makromol. Chem., vol. 178, No. 3 (1977), pp. 863-872.
EPO; Application No. 21858016.5; Extended European Search Report dated Feb. 2, 2024, 10 pages.
Ridgway, "Structure-Property Relationships in Polyamides Containing Cyclohexylene or Phenylene Structures" Journal of Polymer Science, vol. 12 (1974), pp. 2005-2016.

(Continued)

*Primary Examiner* — Rachel Kahn
(74) *Attorney, Agent, or Firm* — Fitch, Even, Tabin & Flannery LLP

(57) ABSTRACT

Provided is a polyamide resin having a low mass loss at a temperature slightly higher than the melting point. The polyamide resin includes diamine-derived structural units and dicarboxylic acid-derived structural units, and of the diamine-derived structural units, from 70 to 97 mol % are derived from p-benzenediethanamine and from 3 to 30 mol % are derived from a diamine represented by formula (1). 50 mol % or more of the dicarboxylic acid-derived structural units are derived from an aromatic dicarboxylic acid.

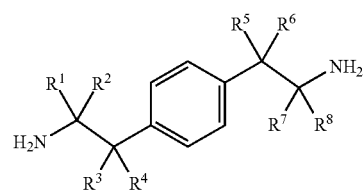

13 Claims, No Drawings

(56) References Cited

OTHER PUBLICATIONS

Saotome et al., "Polyamides Having Long Methylene Chain Units" Journal of Polymer Science, vol. 4, No. 6 (1966), pp. 1463-1473.
Marchildon, "Polyamides—Still Strong After Seventy Years" Macromolecular Reaction Engineering, vol. 5, No. 1 (2011), pp. 22-54.
Office Action issued in co-pending U.S. Appl. No. 18/021,791; dated Aug. 14, 2024; 18 pages.

* cited by examiner

POLYAMIDE RESIN

CROSS-REFERENCE TO RELATED APPLICATIONS

This application is a U.S. national phase application filed under 35 U.S.C. § 371 of International Application Number PCT/JP2021/021854 filed Jun. 9, 2021, designating the United States, which claims priority from Japanese Application Number 2020-139069, filed Aug. 20, 2020.

FIELD OF THE INVENTION

The present invention relates to a polyamide resin.

BACKGROUND OF THE INVENTION

Polyamide resins exhibit excellent properties such as processability, durability, heat resistance, gas barrier properties, and chemical resistance, and thus are widely used as various industrial materials.

As such polyamide resins, aliphatic polyamide resins typified by polyamide 6 and polyamide 66 have been used for many years. Furthermore, aromatic polyamide resins in which aromatic dicarboxylic acids and/or aromatic diamines are used as the raw materials of the polyamide resins are also being used. Such aromatic polyamide resins are described in Patent Documents 1 and 2, for example.

CITATION LIST

Patent Documents

Patent Document 1: JP 62-054725 A
Patent Document 2: JP 08-003312 A

SUMMARY OF INVENTION

As described above, polyamide resins are widely used in a variety of fields.

Here, when molded by a method such as injection molding, the polyamide resin is heated to a temperature equal to or higher than the melting point and then molded. Therefore, the polyamide resin is required to exhibit a high level of stability at temperatures slightly higher than the melting point, or in other words, in some cases, the polyamide resin may be required to exhibit a low mass loss rate at temperatures slightly higher than the melting point.

Thus, an object of the present invention is to solve such an issue by providing a polyamide resin with a low mass loss rate at temperatures slightly higher than the melting point.

The present inventors conducted an examination on the basis of the issue described above, and as a result, discovered that the issue can be solved by using, as raw material monomers of the polyamide resin, a diamine represented by formula (1) described below in addition to p-benzenediethanamine and an aromatic dicarboxylic acid.

Specifically, the above issue can be solved by the following means.

<1> A polyamide resin includes diamine-derived structural units and dicarboxylic acid-derived structural units, and, of the diamine-derived structural units, from 70 to 97 mol % are derived from p-benzenediethanamine and from 3 to 30 mol % are derived from a diamine represented by formula (1), and 50 mol % or more of the dicarboxylic acid-derived structural units are derived from an aromatic dicarboxylic acid:

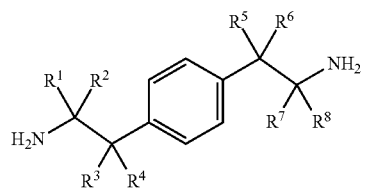

formula (1)

where in formula (1), $R^1$ to $R^8$ each independently represent a hydrogen atom or an aliphatic group having from 1 to 5 carbons, and at least one of $R^1$ to $R^4$ and at least one of $R^5$ to $R^8$ are each an aliphatic group having from 1 to 5 carbons.

<2> The polyamide resin according to <1>, wherein 90 mol % or more of the structural units derived from an aromatic dicarboxylic acid are structural units derived from an aromatic dicarboxylic acid selected from isophthalic acid, terephthalic acid, and phenylenediacetic acid.

<3> The polyamide resin according to <1>, wherein 90 mol % or more of the structural units derived from an aromatic dicarboxylic acid are structural units derived from isophthalic acid.

<4> The polyamide resin according to any one of <1> to <3>, wherein over 95 mol % of the dicarboxylic acid-derived structural units are structural units derived from an aromatic dicarboxylic acid.

<5> The polyamide resin according to any one of <1> to <4>, wherein $R^1$ to $R^8$ in formula (1) each independently represent a hydrogen atom or a methyl group.

<6> The polyamide resin according to any one of <1> to <4>, wherein in formula (1), $R^1$, $R^2$, $R^7$ and $R^8$ are hydrogen atoms, and $R^3$, $R^4$, $R^5$ and $R^6$ are methyl groups.

<7> The polyamide resin according to any one of <1> to <6>, wherein the polyamide resin has a melting point from 270 to 314° C. as measured according to differential scanning calorimetiy.

<8> The polyamide resin according to any one of <1> to <7>, wherein an enthalpy change (ΔH) of the polyamide resin when melted as evaluated through differential scanning calorimetry is from 5 to 80 J/g.

<9> The polyamide resin according to any one of <1> to <8>, wherein the polyamide resin has a mass loss rate of 4.5% or less at a temperature 25° C. higher than the melting point, as measured according to differential scanning calorimetry.

According to the present invention, a polyamide resin having a low mass loss rate at a temperature slightly higher than the melting point can be provided.

DESCRIPTION OF EMBODIMENTS

Hereinafter, embodiments for carrying out the present invention (referred to simply as "the present embodiment" below) will be described in detail. Note that the following present embodiments are examples for describing the present invention, and the present invention is not limited to the present embodiments.

In the present description, "from . . . to . . . " or "of . . . to . . . " is used to mean that the numerical values described before and after "to" are included as the lower limit and the upper limit, respectively.

In the present description, various physical property values and characteristic values are at 23° C. unless otherwise noted.

A polyamide resin according to the present embodiment includes diamine-derived structural units and dicarboxylic acid-derived structural units, and is characterized in that, of the diamine-derived structural units, from 70 to 97 mol % are derived from p-benzenediethanamine and from 3 to 30 mol % are derived from a diamine represented by formula (1), and 50 mol % or more of the dicarboxylic acid-derived structural units are derived from an aromatic dicarboxylic acid:

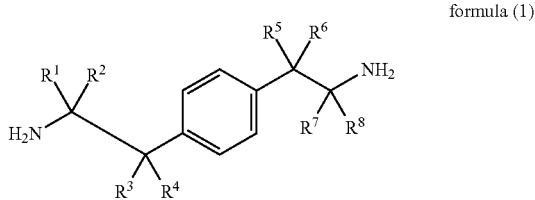

formula (1)

where in formula (1), $R^1$ to $R^8$ each independently represent a hydrogen atom or an aliphatic group having from 1 to 5 carbons, and at least one of $R^1$ to $R^4$ and at least one of $R^5$ to $R^8$ are each an aliphatic group having from 1 to 5 carbons.

Through such a constitution, the mass loss rate at a temperature slightly higher than the melting point can be suppressed. It is presumed that the reason for this is that by using a diamine represented by formula (1), the melting point can be lowered some extent, and the mass loss rate at a temperature slightly higher than the melting point can be reduced. In addition, since the melting point can be lowered some extent, a polyamide resin suitable for mold-based molding such as injection molding can be obtained. Furthermore, a polyamide resin having a high glass transition temperature and excellent thermal resistance can be obtained.

Diamine-Derived Structural Unit

In the polyamide resin of the present embodiment, of the diamine-derived structural units, from 70 to 97 mol % are derived from p-benzenediethanamine and from 3 to 30 mol % are derived from a diamine represented by formula (1). By using, as the diamine serving as the raw material monomer, p-benzenediethanamine as the main component and substituting some of the diamine with a diamine represented by formula (1) in this manner, the enthalpy change (ΔH) during melting can be controlled to an appropriate range while maintaining an appropriate melting point Tm and a high glass transition temperature Tg.

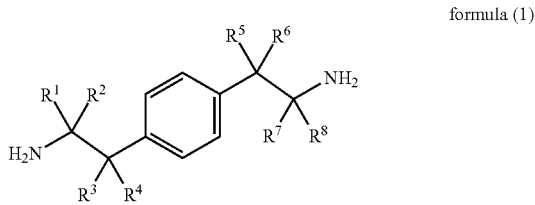

formula (1)

where in formula (1), $R^1$ to $R^8$ each independently represent a hydrogen atom or an aliphatic group having from 1 to 5 carbons, and at least one of $R^1$ to $R^4$ and at least one of $R^5$ to $R^8$ are each an aliphatic group having from 1 to 5 carbons.

In the present embodiment, of the diamine-derived structural units, from 70 to 97 mol % are derived from p-benzenediethanamine, and from 3 to 30 mol % are derived from a diamine represented by formula (1). However, the total of the p-benzenediethanamine and the diamine represented by formula (1) does not exceed 100 mol %, and the total thereof is preferably from 90 to 100 mol %, more preferably from 95 to 100 mol %, and even more preferably from 99 to 100 mol %.

In the present embodiment, of the diamine-derived structural units, the percentage of structural units derived from p-benzenediethanamine is 70 mol % or higher, preferably 75 mol % or higher, more preferably 80 mol % or higher, even more preferably 84 mol % or higher, yet even more preferably 88 mol % or higher, and still even more preferably 91 mol % or higher. The mechanical properties at high temperatures tend to be more excellent when the percentage of structural units derived from p-benzenediethanamine is equal to or more than the lower limit described above. Furthermore, in the present embodiment, the percentage of structural units derived from p-benzenediethanamine amongst the diamine-derived structural units is 97 mol % or less, and preferably 96 mol % or less, and may be 94 mol % or less. When the foregoing percentage is set to equal to or less than the upper limit described above, the mass loss rate at a temperature slightly higher than the melting point can be reduced, and the thermal stability during molding tends to improve.

In the present embodiment, of the diamine-derived structural units, the percentage of structural units derived from a diamine represented by formula (1) is 3 mol % or higher, and preferably 4 mol % or higher, and may be 6 mol % or higher. When the foregoing percentage is set to equal to or more than the lower limit described above, the mass loss rate at temperatures slightly higher than the melting point can be reduced, and the thermal stability during molding tends to improve. In addition, in the present embodiment, the percentage of structural units derived from a diamine represented by formula (1) is 30 mol % or less, preferably 25 mol % or less, more preferably 20 mol % or less, even more preferably 16 mol % or less, still even more preferably 12 mol % or less, and yet even more preferably 9 mol % or less. When the percentage of structural units derived from a diamine represented by formula (1) is not more than the upper limit described above, the mechanical properties at high temperatures tend to be more excellent.

In the present embodiment, the diamine represented by formula (1) in the diamine-derived structural units may be only one type, or may be two or more types. When two or more types of the diamine represented by formula (1) are contained, the total amount thereof is preferably in the above described range.

Next, the diamine represented by formula (1) will be described. In the present embodiment, the diamine represented by formula (1) is such that at least one aliphatic group having from 1 to 5 carbons is substituted in the ethylene chain portion of the p-benzenediethanamine. It is presumed that when the diamine has such an aliphatic group, hydrogen bonding between amide groups and stacking of aromatic rings are inhibited without significantly changing the distance between amide groups in the molecular chain, and thereby the melting point can be reduced a certain extent, and the mass loss rate at a temperature slightly higher than the melting point can be reduced. As a result, it is presumed that the effect of improving the thermal stability during molding is more effectively exhibited.

In formula (1), $R^1$ to $R^8$ each independently represent a hydrogen atom or an aliphatic group having from 1 to 5 carbons, and at least one of $R^1$ to $R^4$ and at least one of $R^5$ to $R^8$ are each an aliphatic group having from 1 to 5 carbons. The aliphatic groups having from 1 to 5 carbons is preferably an aliphatic group having from 1 to 3 carbons, and more preferably an aliphatic group having 1 or 2 carbons. Examples of such aliphatic groups include alkyl groups, alkenyl groups, and alkynyl groups, and of these, alkyl groups are preferable, and linear alkyl groups are more preferable. Examples of the alkyl groups include a methyl group, an ethyl group, an i-propyl group, an i-butyl group and a t-butyl group. The alkyl group is preferably a methyl group or an ethyl group, and is more preferably a methyl group.

In formula (1), preferably, at least two of $R^1$ to $R^4$ and at least two of $R^1$ to $R^8$ are each an aliphatic group having from 1 to 5 carbons, and more preferably two of $R^1$ to $R^4$ and two of $R^5$ to $R^8$ are each an aliphatic group having from 1 to 5 carbons.

In formula (1), preferably, $R^1$ to $R^8$ each independently represent a hydrogen atom or a methyl group. More preferably, $R^1$ and/or $R^2$, and $R^7$ and/or $R^8$ denote a hydrogen atom, of $R^1$, $R^2$, $R^7$ and $R^8$, a moiety not representing a hydrogen atom is a methyl group, and $R^3$, $R^4$, $R^5$ and $R^6$ represent a hydrogen atom or a methyl group (preferably a methyl group). Even more preferably, $R^1$, $R^2$, $R^7$ and $R^8$ each represent a hydrogen atom, and $R^3$, $R^4$, $R^5$ and $R^6$ each represent a hydrogen atom or a methyl group (preferably a methyl group). When such a compound is used, the reactivity of the amino group in the diamine represented by formula (1) increases, and as a result, polymerization tends to easily proceed, and productivity tends to increase.

Furthermore, in the present embodiment, a mixture of a compound (compound 1-1) in which, in formula (1), at least two (preferably two) of $R^1$ to $R^4$ and at least two (preferably two) of $R^5$ to $R^8$ are aliphatic groups having from 1 to 5 carbons and a compound (compound 1-2) in which, in formula (1), one of $R^1$ to $R^4$ and one of $R^5$ to $R^8$ are aliphatic groups having from 1 to 5 carbons may be used. In the case of a mixture, the mass ratio of the compound 1-1 to the compound 1-2 is preferably from 1:0.1 to 1:1.

In the present embodiment, the diamine-derived structural units may include other structural units in addition to those described above. Examples of such other structural units include ones derived from m-benzenediethanamine, o-benzenediethanamine, aliphatic diamines, alicyclic diamines and other aromatic diamines besides benzenediethanamine and diamines represented by formula (1).

The polyamide resin of the present embodiment may include only a single type of structural unit derived from another diamine, or may include two or more types of structural units derived from those other diamines.

A well-known aliphatic diamine can be widely adopted as the aliphatic diamine, and the aliphatic diamine is preferably an aliphatic diamine having from 6 to 12 carbons. Examples thereof include linear aliphatic diamines, such as 1,6-hexanediamine, 1,7-heptanediamine, 1,8-octanediamine, 1,9-nonanediamine, 1,10-decanediamine, 1,11-undecanediamine, and 1,12-dodecanediamine; and branched aliphatic diamines, such as 2-methyl-1,8-octanediamine, 4-methyl-1,8-octanediamine, 5-methyl-1,9-nonanediamine, 2,2,4-/2,4,4-trimethylhexamethylenediamine, 2-methyl-1,5-pentanediamine, 2-methyl-1,6-hexanediamine, and 2-methyl-1,7-heptanediamine.

A well-known alicyclic diamine can be widely adopted as the alicyclic diamine, and examples include 1,2-bis(aminomethyl) cyclohexane, 1,3-bis(aminomethyl) cyclohexane, 1,4-bis(aminomethyl) cyclohexane, isophoronediamine, 4,4'-thiobis(cyclohexan-1-amine), and 4,4'-thiobis(cyclohexan-1-amine).

Additionally, for details on other aromatic diamines, reference can be made to the disclosure of paragraph [0052] of WO 2017/126409, the contents of which are incorporated herein by reference.

Dicarboxylic Acid-Derived Structural Unit

In the polyamide resin of the present embodiment, 50 mol % or more of the dicarboxylic acid-derived structural units are derived from an aromatic dicarboxylic acid. Including a structural unit derived from an aromatic dicarboxylic acid tends to result in a polyamide resin having a higher melting point and a higher glass transition temperature.

In the present embodiment, the percentage of structural units derived from an aromatic dicarboxylic acid among the dicarboxylic acid-derived structural units is 50 mol % or higher, preferably 70 mol % or higher, more preferably 80 mol % or higher, even more preferably 90 mol % or higher, yet even more preferably more than 95 mol %, and still even more preferably 99 mol % or higher. When the percentage of structural units derived from an aromatic dicarboxylic acid is equal to or more than the lower limit described above, the crystallinity of the polyamide resin tends to improve, and the degree of crystallization of the molded article and the strength when the polyamide resin is molded at a high temperature tend to improve. In the present embodiment, the upper limit of the percentage of structural units derived from an aromatic dicarboxylic acid among the dicarboxylic acid-derived structural units is 100 mol % or less.

A preferable example of the aromatic dicarboxylic acid in the present embodiment is phenylene dicarboxylic acid.

Another preferable example of the aromatic dicarboxylic acid in the present embodiment is an aromatic dicarboxylic acid represented by formula (FC):

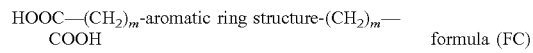

$$\text{HOOC—(CH}_2)_m\text{-aromatic ring structure-(CH}_2)_m\text{—COOH} \qquad \text{formula (FC)}$$

where in formula (FC), m is 0, 1 or 2.

Here, m is preferably 0 or 1, and is more preferably 0.

In formula (FC), the aromatic ring structure is a structure including an aromatic ring, is preferably a structure including an aromatic ring only, or a structure including an aromatic ring and a substituent thereof only, and is more preferably a structure including an aromatic ring only. Examples of substituents that may be present on the aromatic ring include alkyl groups having from 1 to 3 carbons or halogen atoms.

The aromatic ring structure may be either a single ring or a condensed ring, and a single ring is preferred. Furthermore, the number of carbons constituting the aromatic ring is not particularly specified, but a 6 to 15 membered ring is preferable.

More specifically, the aromatic ring structure is preferably a benzene ring, a naphthalene ring, a benzene ring having a substituent, or a naphthalene ring having a substituent, is more preferably a benzene ring or a benzene ring having a substituent, and is even more preferably a benzene ring.

More specific examples of aromatic dicarboxylic acids in the present embodiment include isophthalic acid, terephthalic acid, phenylenediacetic acids (o-phenylenediacetic acid, p-phenylenediacetic acid, and m-phenylenediacetic acid), and naphthalenedicarboxylic acids (1,2-naphthalenedicarboxylic acid, 1,3-naphthalenedicarboxylic acid, 1,4-naphthalenedicarboxylic acid, 1,5-furandicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid).

Among these, the aromatic dicarboxylic acid is preferably selected from isophthalic acid, terephthalic acid, and phenylenediacetic acid (preferably, p-phenylenediacetic acid), is more preferably isophthalic acid or phenylenediacetic acid, and is even more preferably isophthalic acid. When isophthalic acid is used, a cyclic monomer is less likely to be formed, and the generated amount of outgassing tends to decrease. Reducing the generated amount of outgassing decreases mold contamination during injection molding, and as a result, the frequency at which the mold must be cleaned decreases, and productivity tends to improve.

In the polyamide resin of the present embodiment, of the structural units derived from an aromatic dicarboxylic acid, 90 mol % or more (preferably more than 95 mol %, more preferably 99 mol % or more) are preferably structural units derived from an aromatic dicarboxylic acid selected from isophthalic acid, terephthalic acid, and phenylenediacetic acid, and are more preferably structural units derived from isophthalic acid.

The polyamide resin of the present embodiment may include a dicarboxylic acid-derived structural unit besides the structural unit derived from an aromatic dicarboxylic acid. Examples of dicarboxylic acids constituting the dicarboxylic acid-derived structural unit besides the structural unit derived from an aromatic dicarboxylic acid include aliphatic dicarboxylic acids. A known aliphatic dicarboxylic acid can be used as the aliphatic dicarboxylic acid, and examples include succinic acid, glutaric acid, adipic acid, pimelic acid, suberic acid, azelaic acid, sebacic acid, and dodecanedicarboxylic acid.

The polyamide resin of the present invention can be constituted so as to be substantially free of a structural unit derived from an aliphatic dicarboxylic acid. "Substantially free" means that the percentage of structural units derived from an aliphatic dicarboxylic acid among the dicarboxylic acid-derived structural units is 5 mol % or less, preferably 3 mol % or less, and more preferably 1 mol % or less.

Furthermore, in the polyamide resin of the present embodiment, more than 95 mol % (preferably, not less than 96 mol %, and more preferably not less than 98 mol %, and not more than 100 mol %) of the diamine-derived structural units and the dicarboxylic acid-derived structural units are preferably structural units having a cyclic structure. Through such a constitution, a polyamide resin having a high melting point and a higher glass transition temperature can be obtained. Furthermore, the mass loss rate can be reduced. Moreover, the enthalpy change (ΔH) when melting can be reduced, and the moldability tends to further improve. In addition, the amount of outgassing can be reduced. A structural unit having a cyclic structure means a structural unit that includes a cyclic structure such as an aromatic ring or an alicyclic ring. A structural unit having one cyclic structure preferably includes either an aromatic ring or an alicyclic ring.

Specific examples of the polyamide resin of the present embodiment include the following. Of course, the polyamide resin of the present embodiment is not limited to the following examples.

(1) A polyamide resin in which of the diamine-derived structural units, from 80 to 97 mol % (preferably from 84 to 97 mol %) are derived from p-benzenediethanamine and from 3 to 20 mol % (preferably from 3 to 16 mol %) are derived from a diamine represented by formula (1), and of the dicarboxylic acid-derived structural units, from 90 to 100 mol % (preferably from 95 to 100 mol %, more preferably from 98 to 100 mol %) are derived from isophthalic acid.

(2) A polyamide resin in which of the diamine-derived structural units, from 70 to 80 mol % are derived from p-benzenediethanamine and from 20 to 30 mol % are derived from a diamine represented by formula (1), and of the dicarboxylic acid-derived structural units, from 90 to 100 mol % (preferably, from 95 to 100 mol %, more preferably from 98 to 100 mol %) are derived from terephthalic acid and from 0 to 10 mol % are derived from (1,4-cyclohexane dicarboxylic acid).

In (1) and (2) above, the total of structural units derived from p-benzenediethanamine and structural units derived from a diamine represented by formula (1) is 100 mol % or less, preferably from 95 to 100 mol %, and more preferably from 98 to 100 mol %.

Note that the polyamide resin of the present invention includes a dicarboxylic acid-derived structural unit and a diamine-derived structural unit, but may also include other structural units besides the dicarboxylic acid-derived structural unit and the diamine-derived structural unit, or other moieties such as a terminal group. Examples of other structural units include, but are not limited to, structural units derived from, for example, a lactam such as s-caprolactam, valerolactam, laurolactam, and undecalactam, or from an aminocarboxylic acid such as 11-aminoundecanoic acid and 12-aminododecanoic acid. Furthermore, the polyamide resin of the present embodiment may contain trace amounts of other components such as an additive used in synthesis.

Of the polyamide resin of the present embodiment, preferably 70 mass % or more, more preferably 80 mass % or more, even more preferably 90 mass % or more, still more preferably 95 mass % or more, and yet even more preferably 98 mass % or more are dicarboxylic acid-derived structural units and diamine-derived structural units.

Physical Properties of Polyamide Resin

Next, the physical properties of the polyamide resin of the present embodiment will be described.

The polyamide resin of the present embodiment is a crystalline polyamide resin and has a melting point. The melting point (Tm) of the polyamide resin of the present embodiment, measured in accordance with differential scanning calorimetry, is preferably 270° C. or higher, more preferably 280° C. or higher, even more preferably 285° C. or higher, still even more preferably 290° C. or higher, yet even more preferably 293° C. or higher, and even more preferably 296° C. or higher. When the melting point is set to the above-described lower limit or higher, there is a tendency of being able to effectively reduce deformation and/or surface roughness of a molded article obtained using the polyamide resin of the present embodiment when the molded article is subjected to reduced lead soldering and/or the lead-free soldering. The melting point is also preferably 314° C. or lower, more preferably 312° C. or lower, even more preferably 310° C. or lower, yet even more preferably 308° C. or lower, and still even more preferably 306° C. or lower. When the melting point is set to equal to or lower than the upper limit described above, the mass loss rate can be further reduced, and the thermal stability during molding tends to further improve.

The melting point is measured in accordance with a method described in the Examples below.

The glass transition temperature (Tg) of the polyamide resin of the present embodiment, measured in accordance with differential scanning calorimetry, is preferably 90° C. or higher, more preferably 110° C. or higher, even more preferably 120° C. or higher, still even more preferably 130° C. or higher, and yet even more preferably 140° C. or higher. A high elastic modulus can be more effectively maintained even in a high temperature environment by setting the glass transition temperature thereof to the above-described lower limit or higher. The glass transition temperature is also preferably 200° C. or lower, more preferably 180° C. or lower, even more preferably 170° C. or lower, still even more preferably 160° C. or lower, and yet even more preferably 155° C. or lower. When the glass transition temperature is set to equal to or lower than the upper limit described above, the fluidity when melted increases, and the moldability tends to further improve.

The glass transition temperature is measured according to a method described in Examples below.

The cold crystallization temperature (Tcc) of the polyamide resin of the present embodiment, measured in accordance with differential scanning calorimetry, is preferably 180° C. or higher, more preferably 195° C. or higher, even more preferably 205° C. or higher, still even more preferably 215° C. or higher, and yet even more preferably 225° C. or higher. When the cold crystallization temperature is equal to or higher than the lower limit described above, the crystallinity of the polyamide resin tends to improve, and the degree of crystallization of the molded article and the strength at high temperatures tend to improve. The cold crystallization temperature is also preferably 310° C. or lower, more preferably 300° C. or lower, even more preferably 290° C. or lower, yet even more preferably 280° C. or lower, and still even more preferably 270° C. or lower. By setting the cold crystallization temperature thereof to the upper limit described above or lower, the molding shrinkage rate tends to decrease.

The cold crystallization temperature is measured in accordance with a method described in the Examples below.

A temperature difference (Tm−Tcc) between the melting point and the cold crystallization temperature of the polyamide resin of the present embodiment is preferably 20° C. or more, more preferably 30° C. or more, even more preferably 32° C. or more, yet even more preferably 35° C. or more, still even more preferably 40° C. or more, and even further preferably 45° C. or more. By setting the temperature difference thereof to the lower limit described above or more, the molding shrinkage rate tends to decrease.

In addition, the upper limit of the temperature difference (Tm−Tcc) between the melting point and the cold crystallization temperature of the polyamide resin of the present embodiment is preferably 120° C. or less, more preferably 110° C. or less, even more preferably 100° C. or less, yet even more preferably 90° C. or less, and still even more preferably 80° C. or less. When the temperature difference is equal to or less than the upper limit described above, the crystallinity of the polyamide resin tends to improve, and the degree of crystallization of the molded article and the strength at high temperatures tend to improve.

As evaluated through differential scanning calorimetiy, the enthalpy change ΔH of the polyamide resin of the present embodiment when melted is preferably 5 J/g or more, more preferably 10 J/g or more, even more preferably 15 J/g or more, yet even more preferably 20 J/g or more, still even more preferably 25 J/g or more, and still further preferably 30 J/g or more. When the enthalpy change ΔH is equal to or more than the lower limit indicated above, the crystallinity of the polyamide resin tends to improve, and the degree of crystallization of the molded article and the strength at high temperatures tend to further improve. Moreover, the ΔH is preferably 80 J/g or less, more preferably 70 J/g or less, even more preferably 60 J/g or less, yet even more preferably 55 J/g or less, still even more preferably 50 J/g or less, and still further preferably 49 J/g or less. By setting the ΔH thereof to the upper limit described above or less, the molding shrinkage rate tends to decrease.

The enthalpy change ΔH when melted is measured in accordance with a method described in the Examples below.

After being heated for 30 minutes at a temperature 25° C. higher than the melting point, the polyamide resin of the present embodiment preferably has a low mass loss rate in accordance with differential scanning calorimetry. Specifically, the mass loss rate is preferably 4.5% or less, more preferably 3.5% or less, even more preferably 3.0% or less, yet even more preferably 2.5% or less, and still even more preferably 2.0% or less. When the mass loss rate is set to the upper limit described above or lower, the thermal stability when molding further improves, and moldability tends to be further improved. The lower limit of the mass loss rate is desirably 0%, but a mass loss rate of 0.01% or higher or 0.1% or higher is practical.

The mass loss rate is measured in accordance with a method described in the examples below.

Method for Producing Polyamide Resin

The polyamide resin of the present embodiment is preferably produced by a melt polycondensation (melt polymerization) method or a pressurized salt method using a phosphorus atom-containing compound as a catalyst, and production by the pressurized salt method is more preferable. A preferable method as the melt polycondensation method is a method in which a raw material diamine is added dropwise to a molten raw material dicarboxylic acid and heated under pressure to cause polymerization while condensed water is removed. A preferable method as the pressurized salt method is a method in which a salt formed from a raw material diamine and a raw material dicarboxylic acid is heated under pressure in the presence of water to cause polymerization in a molten state while added water and condensed water are removed.

Specific examples of the phosphorus atom-containing compound include phosphinic acid compounds, such as dimethyl phosphinic acid, phenyl methyl phosphinic acid; hypophosphorous acid compounds, such as hypophosphorous acid, sodium hypophosphite, potassium hypophosphite, lithium hypophosphite, magnesium hypophosphite, calcium hypophosphite, and ethyl hypophosphite; phosphonic acid compounds, such as phosphonic acid, sodium phosphonate, lithium phosphonate, potassium phosphonate, magnesium phosphonate, calcium phosphonate, phenyl phosphonate, ethyl phosphonate, sodium phenyl phosphonate, potassium phenyl phosphonate, lithium phenyl phosphonate, diethyl phenyl phosphonate, sodium ethyl phosphonate, and potassium ethyl phosphonate; phosphonous acid compounds, such as phosphonous acid, sodium phosphonite, lithium phosphonite, potassium phosphonite, magnesium phosphonite, calcium phosphonite, phenyl phosphonite, sodium phenyl phosphonite, potassium phenyl phosphonite, lithium phenyl phosphonite, and ethyl phenyl phosphonite; and phosphonic acid compounds, such as phosphonic acid, sodium hydrogen phosphite, sodium phosphite, lithium phosphite, potassium phosphite, magnesium phosphite, calcium phosphite, triethyl phosphite, triphenyl phosphite, and pyrophosphite. Of these, sodium hypophosphite and calcium hypophosphite are preferable, and calcium hypophosphite is more preferable. When calcium hypophosphite is used, the heat resistance of the obtained polyamide resin tends to further improve.

A single type of these phosphorus atom-containing compounds can be used alone, or a combination of two or more types can be used.

The addition amount of the phosphorus atom-containing compound is preferably an amount at which the concentration of phosphorus atoms in the polyamide resin is from 0.001 to 0.1 mass %. Setting the addition amount thereof to such a range tends to result in an improvement in the thermal resistance of the polyamide resin and a reduction in the mass loss rate at temperatures slightly higher than the melting point.

In the present embodiment, a polymerization rate modifier may be added in addition to the phosphorus atom-containing compound. Examples of the polymerization rate modifier include alkali metal hydroxides, alkaline earth metal hydroxides, alkali metal acetates, and alkaline earth metal acetates, and alkali metal acetates are preferable.

Examples of alkali metal atoms include sodium, potassium and lithium, and sodium is preferable. Examples of alkaline earth metal atoms include calcium and magnesium.

Specific examples of the polymerization rate modifier include lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate, and barium acetate. Among these, the polymerization rate modifier is preferably at least one selected from the group including sodium hydroxide, potassium hydroxide, magnesium hydroxide, calcium hydroxide, sodium acetate, potassium acetate, and calcium acetate, is more preferably at least one selected from the group including sodium acetate, potassium acetate, and calcium acetate, and is even more preferably sodium acetate.

One of these polymerization rate modifiers can be used alone, or two or more can be used in combination.

The addition amount of the polymerization rate modifier is preferably from 0.001 to 0.5 mass % of the total amount of the raw materials diamine and dicarboxylic acid.

Applications

The polyamide resin of the present embodiment can be used in a composition (hereinafter, may be referred to as the "resin composition of the present embodiment") containing the polyamide resin of the present embodiment, and can be used in a molded article formed from the composition thereof. The composition may consist of only one or more types of the polyamide resin of the present embodiment, or may include other components.

As other components, additives such as another polyamide resin besides the polyamide resin of the present invention, a thermoplastic resin besides the polyamide resin, fillers, matting agents, heat resistant stabilizers, weather resistant stabilizers, ultraviolet absorbents, plasticizers, flame retardants, antistatic agents, coloring inhibitors, and anti-gelling agents can be added as necessary. One, or two or more of these additives may each be used.

As other components, additives such as a polyamide resin besides the polyamide resin of the present invention, a thermoplastic resin besides the polyamide resin, reinforcing materials (fillers), antioxidants such as heat resistant stabilizers and weather resistant stabilizers (particularly heat resistant stabilizers), flame retardants, flame retardant aids, mold release agents, dripping inhibitors, matting agents, ultraviolet absorbers, plasticizers, antistatic agents, color inhibitors, and anti-gelling agents can be added as necessary. One, or two or more of these additives may each be used.

Other Polyamide Resin

Other polyamide resin that may be included in the resin composition of the present embodiment may be an aliphatic polyamide resin or a semi-aromatic polyamide resin.

Examples of the aliphatic polyamide resin include polyamide 6, polyamide 66, polyamide 46, polyamide 6/66 (copolymer of a polyamide 6 component and a polyamide 66 component), polyamide 610, polyamide 612, polyamide 410, polyamide 1010, polyamide 11, polyamide 12, and polyamide 9C (a polyamide formed from a mixed diamine of 1,9-nonanediamine and 2-methyl-1,8-octanediamine and 1,4-cyclohexane dicarboxylic acid).

Examples of the semi-aromatic polyamide resin include polyamide 4T, polyamide 6T, polyamide 6I, polyamide 6T/6I, polyamide 9T, polyamide 10T, and polyamide 9N (a polyamide fonned from a mixed diamine of 1,9-nonanediamine and 2-methyl-1,8-octanediamine and 2,6-naphthalene dicarboxylic acid).

The semi-aromatic polyamide resin includes a diamine-derived structural unit and a dicarboxylic acid-derived structural unit, and an example includes a xylylene diamine-based polyamide resin in which 70 mol % or more of the diamine-derived structural units are derived from meta-xylylene diamine and/or para-xylylene diamine, and 70 mol % or more of the dicarboxylic acid-derived structural units are derived from an $\alpha,\omega$-linear aliphatic dicarboxylic acid having from 4 to 20 carbons. Specific examples include MXD6, which is a polycondensate of meta-xylylene diamine and adipic acid, MXD6I, which is a polycondensate of meta-xylylene diamine, adipic acid, and isophthalic acid, MP6, which is a polycondensate of meta-xylylene diamine, para-xylylene diamine, and adipic acid, MXD10, which is a polycondensate of meta-xylylene diamine and sebacic acid, MP10, which is a polycondensate of meta-xylylene diamine, para-xylylene diamine, and sebacic acid, and PXD10, which is a polycondensate of para-xylylene diamine and sebacic acid.

Furthermore, examples of the semi-aromatic polyamide resin include polyamide resins that are polycondensates of at least one diamine selected from the group including 1,9-nonanediamine, 2-methyl-1,8-octanediamine, and 1,10-decandiamine, and terephthalic acid and/or naphthalene dicarboxylic acid. In particular, a polyamide resin that is a polycondensate of 1,9-nonanediamine, 2-methyl-1,8-octanediamine and naphthalene dicarboxylic acid is preferable.

When the resin composition according to the present embodiment contains another polyamide resin, the content of the other polyamide resin in relation to 100 parts by mass of the polyamide resin of the present embodiment is preferably 1 part by mass or more, and may be 10 parts by mass or more, and is preferably 100 parts by mass or less, more preferably 50 parts by mass or less, and even more preferably 30 parts by mass or less. The resin composition of the present embodiment may contain only one type of the other polyamide resin or may contain two or more types thereof. When two or more types of other polyamide resins are contained, the total amount thereof is preferably in the above range.

Thermoplastic Resin Besides Polyamide Resins

Examples of thermoplastic resins other than polyamide resins include polyester resins, such as polyethylene terephthalate, polybutylene terephthalate, polyethylene naphthalate, and polybutylene naphthalate. One, or two or more of these thermoplastic resins other than the polyamide resin each may be used.

Antioxidant

The resin composition of the present embodiment may contain an antioxidant. A molded article having excellent heat resistance can be obtained by including an antioxidant.

Examples of the antioxidant include an aspect containing an organic antioxidant, and more specifically, an aspect containing a primary antioxidant and a secondary antioxidant. Another example of the antioxidant is an aspect containing an inorganic antioxidant. In addition, the resin composition may contain both an organic antioxidant and an inorganic antioxidant.

The primary antioxidant serves as a so-called radical scavenger, and for example, plays a role of scavenging various radicals produced by auto-oxidation and producing a hydroperoxide. Examples of the primary antioxidant include phenol-based antioxidants (preferably hindered phenol-based antioxidants) and amine-based antioxidants.

The secondary antioxidant serves as a so-called peroxide decomposer, and for example, plays a role of decomposing the generated hydroperoxide and converting the hydroperoxide to a stable alcohol compound. Examples of the secondary antioxidant include phosphorus-based antioxidants and sulfur-based antioxidants.

By using a primary antioxidant and a secondary antioxidant in combination, the anti-oxidation functions are manifested in a linked manner, and an anti-oxidation effect can be more effectively exhibited. Use of a phenol-based antioxidant (preferably a hindered phenol-based antioxidant) and a phosphorus-based antioxidant in combination is particularly preferable. When a primary antioxidant and a secondary antioxidant are used in combination, the antioxidants are preferably in a mixture having a ratio (mass ratio) of the primary antioxidant to the secondary antioxidant from 1:0.1 to 1:10, and more preferably a mixture having a ratio from 1:0.5 to 1:2.

Specifically, the phenol-based antioxidant is preferably a hindered phenol-based antioxidant. Here, the hindered phenol-based antioxidant is, for example, a compound having a hindered phenol structure with a bulky substituent on at least one of the carbon atoms located at both sides of the carbon atom to which the OH group of the phenyl group is bonded, and a t-butyl group is commonly used as the bulky substituent. Hindered phenol-based antioxidants are usually classified into hindered types and less-hindered types, and hindered types are preferable. The hindered type is a compound having a bulky substituent at each of the carbon atoms located at both sides of the carbon atom to which the OH group of the phenyl group is bonded. On the other hand, the less-hindered type is a hindered phenol-based antioxidant having a bulky substituent at only one of the carbon atoms located at both sides of the carbon atom to which the OH group of the phenyl group is bonded, or is a hindered phenol-based antioxidant not having a bulky substituent at either of the carbon atoms located at both sides of the carbon atom to which the OH group of the phenyl group is bonded. In particular, in the present embodiment, a hindered phenol-based antioxidant having from 2 to 6 hindered phenol structures is preferable, and a hindered phenol-based antioxidant having two hindered phenol structures is more preferable.

Furthermore, in the present embodiment, a hindered phenol-based antioxidant having an amide bond is preferable, a hindered-type hindered phenol-based antioxidant having an amide bond is more preferable, a hindered phenol-based antioxidant having from 2 to 6 amide bonds and from 2 to 6 hindered-type hindered phenol structures is more preferable, a hindered phenol-based antioxidant (the number of carbons of the alkyl chain portion is preferably from 1 to 5, and more preferably from 2 to 4) having from 2 to 6 di-tert-butyl-4-hydroxyphenyl alkylcarbonyl amide groups is even more preferable, and the hindered phenol-based antioxidant is particularly preferably N,N'-hexan-1,6-diylbis[3-(3,5-di-tert-butyl-4-hydroxyphenylpropionamide].

As commercially available products of hindered-type hindered phenol-based antioxidants, antioxidants sold as the Irganox Series from BASF, and antioxidants sold as the Adeka Stab Series (for example, AO-20, AO-50, AO-50F, AO-60, AO-60G, and AO-330) from Adeka are preferable, and Irganox 1098 is particularly preferable.

Examples of antioxidants preferably used in the present embodiment are described below, but the present embodiment is not limited thereto.

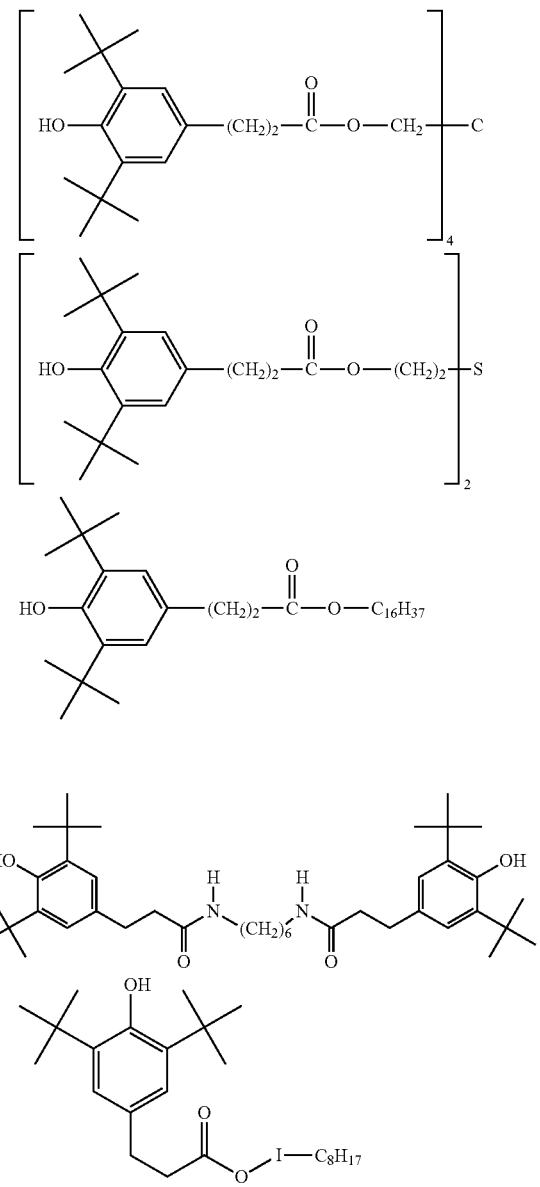

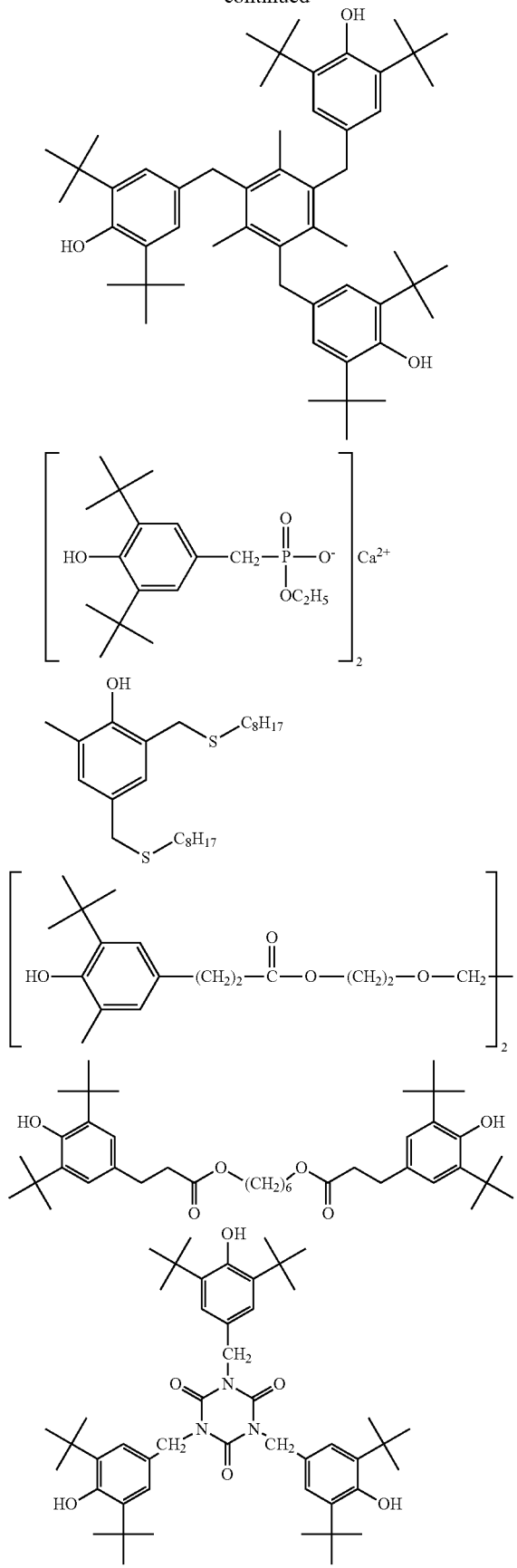

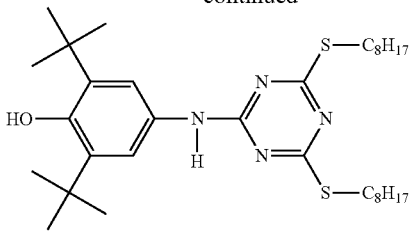

Examples of amine-based antioxidants include amines, such as N, N'-di-2-naphthyl-p-phenylenediamine, N,N-diphenylethylenediamine, N,N-diphenylacetamidine, N,N-diphenylformamidine, N-phenylpiperidine, dibenzylethylenediamine, triethanolamine, phenothiazine, N,N'-di-sec-butyl-p-phenylenediamine, 4,4'-tetramethyl-diaminodiphenylmethane, P,P'-dioctyl-diphenylamine, N,N'-bis(1,4-dimethyl-pentyl)-p-phenylenediamine, phenyl-α-naphthylamine, phenyl-p-naphthylamine, 4,4'-bis(α,α-dimethyl-benzyl)diphenylamine, p-(p-toluenesulfonyl-amide)diphenylamine, and N-phenyl-N'-isopropyl-p-phenylenediamine, amines, such as N-phenyl-N'-(1,3-dimethylbutyl)-p-phenylenediamine, and derivative thereof; reaction products of amines and aldehydes, and reaction products of amines and ketones.

In the present embodiment, in particular, an amine-based antioxidant containing an aromatic ring is preferable, and an amine-based antioxidant containing two or more (preferably from 2 to 5) benzene rings is more preferable.

An amine-based antioxidant represented by formula (A) below and an amine-based antioxidant represented by formula (B) below are preferable.

formula (A)

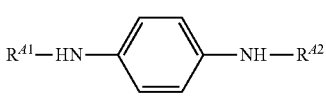

where in formula (A), $R^{A1}$ and $R^{A2}$ are each independently a hydrocarbon group.

$R^{A1}$ and $R^{A2}$ are each preferably an alkyl group or an aryl group, and more preferably, at least one of $R^{A1}$ and $R^{A2}$ is an aiyl group. The alkyl group and the aryl group may have a substituent. Examples of the aryl group include a phenyl group and a naphthyl group.

formula (B)

where in formula (B), $R^{B1}$ and $R^{B2}$ are each independently a hydrocarbon group containing an aromatic ring.

$R^{B1}$ and $R^{B2}$ are each preferably a hydrocarbon group containing two or more aromatic rings, more preferably a hydrocarbon group containing two aromatic rings, even more preferably a hydrocarbon group containing two benzene rings, and yet even more preferably a hydrocarbon group in which two benzene rings are linked by an alkylene group having from 1 to 4 carbons.

The amine-based antioxidant represented by formula (A) and the amine-based antioxidant represented by formula (B) preferably have a molecular weight from 200 to 1200, and more preferably from 300 to 600.

The antioxidant represented by formula (A) has an amine, which is an active moiety, at two locations, and it is thought that thereby, the effect of the present embodiment is more effectively exhibited. Furthermore, other compounds may be copolymerized without departing from the spirit of the present embodiment.

Examples of the phosphorus-based antioxidant include phosphites and phosphates, and a phosphites are more preferable.

Specific examples of the phosphorus-based antioxidant include monosodium phosphate, disodium phosphate, trisodium phosphate, sodium phosphite, calcium phosphite, magnesium phosphite, manganese phosphite, pentaerythritol-based phosphite compounds, trioctylphosphite, trilaurylphosphite, octyldiphenylphosphite, tris isodecylphosphite, phenyldiisodecylphosphite, phenyldi(tridecyl)phosphite, diphenylisooctylphosphite, diphenylisodecylphosphite, diphenyl(tridecyl)phosphite, triphenylphosphite, trioctadecylphosphite, tridecylphosphite, tri(nonylphenyl)phosphite, tris(2,4-di-tert-butylphenyl)phosphite, tris(2,4-di-tert-butyl-5-methylphenyl)phosphite, tris(butoxyethyl)phosphite, 4,4'-butylidene-bis(3-methyl-6-tert-butylphenyl-tetratridecyl)diphosphite, tetra (C12 to C15 mixed alkyl)-4,4'-isopropylidene diphenyl-diphosphite, 4,4'-isopropylidene bis(2-tert-butylphenyl)·di(nonylphenyl)phosphite, tris(biphenyl)phosphite, tetra (tridecyl)-1,1,3-tris(2-methyl-5-tert-butyl-4-hydroxyphenyl) butane diphosphite, tetra(tridecyl)-4,4'-butylidene bis(3-methyl-6-tert-butylphenyl)diphosphite, tetra(C1 to C15 mixed alkyl)-4,4'-isopropylidene diphenyl diphosphite, tris(mono-, di-mixed nonylphenyl)phosphite, 4,4'-isopropylidene bis(2-tert-butylphenyl)·di(nonylphenyl) phosphite, 9,10-dihydro-9-oxa-10-phosphaphenanthrene-10-oxide, tris(3,5-di-tert-butyl-4-hydroxyphenyl)phosphite, hydrogenated-4,4'-isopropylidene diphenyl polyphosphite, bis(octylphenyl)·bis(4,4'-butylidene bis(3-methyl-6-tert-butylphenyl))·1,6-hexanol diphosphite, hexatridecyl-1,1,3-tris(2-methyl-4-hydroxy-5-tert-butylphenyl)diphosphite, tris(4,4'-isopropylidene bis(2-tert-butylphenyl))phosphite, tris(1,3-stearoyloxyisopropyl)phosphite, 2,2-methylene bis (4,6-di-tert-butylphenyl)octylphosphite, 2,2-methylene bis (3-methyl-4,6-di-tert-butylphenyl)-2-ethylhexyl phosphite, tetrakis(2,4-di-tert-butyl-5-methylphenyl)-4,4'-biphenylene diphosphite, tetrakis(2,4-di-tert-butylphenyl)-4,4'-biphenylene diphosphite, and 6-[3-(3-tert-butyl-4-hydroxy-5-methylphenyl)propoxy]-2,4,8,10-tetra-tert-butyldibenzo[d, f] [1,3,2]-dioxaphosphepine.

In the present embodiment, a phosphorus-based antioxidant represented by formula (P) below is preferable.

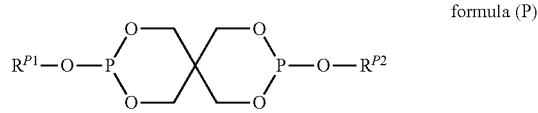

formula (P)

where in formula (P), $R^{P1}$ and $R^{P2}$ are each independently a hydrocarbon group.

$R^{P1}$ and $R^{P2}$ are each preferably an aryl group and more preferably a phenyl group. The aryl group may have a substituent. Examples of the substituent include hydrocarbon groups, and an alkyl group is preferable. The substituent may further have a substituent such as a hydrocarbon group.

The molecular weight of the compound represented by formula (P) is preferably from 400 to 1200, and more preferably from 500 to 800.

Examples of sulfur-based antioxidants include dilauryl thiodipropionate, distearyl thiodipropionate, dimyristyl thiodipropionate, lauryl stearyl thiodipropionate, pentaerythritol tetrakis (3-dodecylthiopropionate), and pentaerythritol tetrakis (3-lauiylthiopropionate), and commercially available products can be used, such as, for example, DSTP "Yoshitomi", DLTP "Yoshitomi", DLTOIB, and DMTP "Yoshitomi" (the above are available from API Corporation), Seenox 412S (available from Shipro Kasei Kaisha, Ltd.), Cyanox 1212 (available from American Cyanamid Co.), and SUMILIZER TP-D (available from Sumitomo Chemical Co., Ltd.) (each is a trade name).

Examples of inorganic antioxidants include copper compounds and alkali halides.

Examples of copper compounds that may be used in the present embodiment include copper halides (e.g., copper iodides, copper bromides, copper chlorides) and copper acetates. The copper compound is preferably selected from copper(I) iodide, copper(II) iodide, copper(I) bromide, copper(II) bromide, copper(I) acetate, copper (II) acetate, copper(I) chloride, and copper(II) chloride, and is more preferably selected from copper iodide, copper acetate, and copper (I) chloride.

The alkali halide used in the present embodiment refers to a halide of an alkali metal. As alkali metals, potassium and sodium are preferable, and potassium is more preferable. Furthermore, the halogen atom is preferably iodine, bromine, or chlorine, and iodine is more preferable. Specific examples of alkali halides used in the present embodiment include potassium iodide, potassium bromide, potassium chloride and sodium chloride.

Additionally, the copper compound and the alkali halide are preferably used in combination. When used in combination, the copper compound and alkali halide are preferably a mixture of a ratio (mass ratio) of the copper compound to the alkali halide from 1:3 to 1:15, and more preferably a mixture of a ratio from 1:4 to 1:8.

Regarding the details when the copper compound and alkali halide are used in combination, reference can be made to the description in paragraphs [0046] to [0048] of JP 2013-513681 T, the contents of which are incorporated herein.

Also, a mixture of a copper complex and a halogen-containing phosphate can be used as an antioxidant other than that described above, a mixture of an antioxidant described above along with the copper complex and halogen-containing phosphate mixture can also be used, and the antioxidants described in paragraphs [0025] to [0039] of JP 2019-532168 T, the content of which is incorporated herein, can also be used.

A polyhydric alcohol can also be used as an antioxidant other than those described above, a mixture of the polyhydric alcohol and the antioxidant described above can also be used, and the antioxidants described in paragraphs [0039] to [0045] of JP 2013-538927 and paragraphs [0083] to [0085] of JP 2014-525506 T, the contents of which are incorporated herein, can also be used.

A metal cyanide salt can also be used as an antioxidant other than the above, a mixture of this metal cyanide salt and an antioxidant described above can also be used, and an antioxidant described in paragraphs [0018] and [0019] of WO 2018/101163, the contents of which are incorporated herein, can also be used.

In addition to the above, the antioxidants described in paragraphs [0025] to [0030] of JP 6466632 B, the antioxidants described in paragraphs [0017]-[0020] of JP 2016-074804 A, the antioxidants described in paragraphs [0044] to [0048] of JP 2021-038370 A, the antioxidants described in paragraphs [0043] to [0056] of JP 2012-179911 A, the antioxidants described in paragraphs [0045] to [0056] of JP 2020-033539 A, and the antioxidants described in paragraphs [0030] to [0038] of WO 2010/143638 can be used. The contents of each of these patent documents are incorporated herein by reference.

When the resin composition of the present embodiment contains an antioxidant, the content of the antioxidant is, in relation to 100 parts by mass of the polyamide resin, preferably 0.01 parts by mass or more, more preferably 0.05 parts by mass or more, even more preferably 0.1 parts by mass or more, still even more preferably 0.2 parts by mass or more, and yet even more preferably 0.4 parts by mass or more. When the content of the antioxidant is equal to or more than lower limit described above, the retention ratio of the weight average molecular weight after heat aging tends to improve, and the retention ratio of the mechanical strength tends to increase. Furthermore, the content of the antioxidant is, in relation to 100 parts by mass of the polyamide resin, preferably 10.0 parts by mass or less, more preferably 5.0 parts by mass or less, even more preferably 3.0 parts by mass or less, yet even more preferably 2.0 parts by mass or less, and still even more preferably 1.5 parts by mass or less. When the content of the antioxidant is equal to or less than the upper limit described above, outgassing during molding is reduced, and thus contamination of the mold is reduced, and continuous productivity tends to be improved.

The resin composition of the present embodiment may include only one type of antioxidant, or may include two or more types thereof. When two or more types of antioxidants are contained, the total amount thereof is preferably in the above range.

Flame Retardant

The resin composition of the present embodiment may contain a flame retardant. Flame retardancy can be improved by using a flame retardant.

Examples of flame retardants include phosphorus-based flame retardants, halogen-based flame retardants, and organic metal salt-based flame retardants. Phosphorus-based flame retardants and halogen-based flame retardants are preferable, and phosphorus-based flame retardants are more preferable.

Examples of phosphorus-based flame retardants include the metal ethyl-phosphinates, metal diethylphosphinates, melamine polyphosphates, condensed phosphates, and phosphazene compounds. Among these, condensed phosphates or phosphazenes are preferable. Furthermore, a thermoplastic resin having excellent miscibility with the phosphorus-based flame retardant may be compounded in order to suppress bleed-out of the flame retardant and the generation of gas or mold deposits during molding. Preferable examples of such thermoplastic resins include polyphenylene ether resins, polycarbonate resins, and styrene-based resins.

The condensed phosphate is preferably a compound represented by formula (FP1) below.

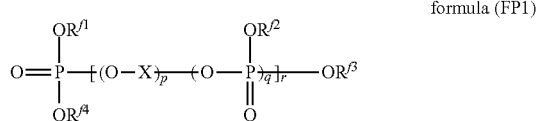

formula (FP1)

where in formula (FP1), $R^{f1}$, $R^{f2}$, $R^{f3}$, and $R^{f4}$ each independently represent a hydrogen atom or an organic group. However, a case in which $R^{f1}$, $R^{f2}$, $R^{f3}$, and $R^{f4}$ all represent a hydrogen atom is excluded. X represents a divalent organic group, p is 0 or 1, q is an integer of 1 or more, and r is an integer of 0 or 1 or more.

Examples of the organic group in formula (FP1) above include alkyl groups, cycloalkyl groups, and aryl groups. Furthermore, a substituent such as an alkyl group, an alkoxy group, an alkylthio group, an aiyl group, an aryloxy group, an arylthio group, a halogen atom, or an aiyl halide may be included. Moreover, a group in which these substituents are combined, or a group in which these substituents are bonded and combined through an oxygen atom, a sulfur atom, a nitrogen atom, or the like may be used. In addition, a divalent organic group refers to a divalent or higher group formed by removing one carbon atom from an organic group described above. Examples thereof include alkylene groups, phenylene groups, substituted phenylene groups, and polynuclear phenylene groups like those derived from bisphenols. The formula weight of each of these groups is preferably from 15 to 300, more preferably from 15 to 200, and even more preferably from 15 to 100.

Specific examples of the condensed phosphate represented by formula (FP1) above include trimethyl phosphate, triethyl phosphate, tributyl phosphate, trioctyl phosphate, triphenyl phosphate, tricresyl phosphate, tricresylphenyl phosphate, octyldiphenyl phosphate, diisopropylphenyl phosphate, tris(chloroethyl)phosphate, tris(dichloropropyl) phosphate, tris(chloropropyl)phosphate, bis(2,3-dibromopropyl)phosphate, bis(2,3-dibromopropyl)-2,3-dichlorophosphate, bis(chloropropyl)monooctyl phosphate, bisphenol A tetraphenyl phosphate, biphenol A tetracresyl diphosphate, bisphenol A tetraxylyl diphosphate, hydroquinone tetraphenyl diphosphate, hydroquinone tetracresyl phosphate, and hydroquinone tetraxylyl diphosphate.

Commercially available condensed phosphates can be easily procured and are sold under the trade names of, for example, "CR733S" (resorcinol bis(diphenylphosphate)), "CR741" (bisphenol A bis(diphenylphosphate)), and "PX-200" (resorcinol bis(dixylenylphosphate)) available from Daihachi Chemical Industry Co., Ltd., and "Adeka Stab FP-700" (phenol condensate of 2,2-bis(p-hydroxyphenyl) propane-trichlorophosphinoxide polycondensate (degree of polymerization of 1 to 3)) available from Asahi Denka Kogyo KK.

The phosphazene compound is an organic compound having a —P=N— bond in the molecule and is preferably at least one type of compound selected from the group including cyclic phosphazene compounds represented by formula (FP2), chain-shaped phosphazene compounds represented by formula (FP3), and crosslinked phosphazene compounds obtained by crosslinking, through a crosslinking group, at least one type of phosphazene compound selected from the group including phosphazene compounds of formula (FP2) and formula (FP3).

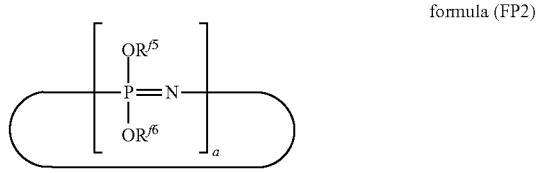

formula (FP2)

where in formula (FP2), a is an integer from 3 to 25, and $R^{f5}$ and $R^{f6}$ may be the same or different and represent an alkyl group, a cycloalkyl group, an alkenyl group, an alkynyl group, an allyloxy group, an amino group, a hydroxy group, an aryl group, or an alkylaryl group.

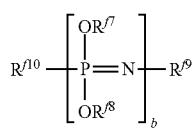

formula (FP3)

where in formula (FP3), b is an integer from 3 to 10000, $R^{f7}$ and $R^{f8}$ may be the same or different and represent an alkyl group, a cycloalkyl group, an alkenyl group, an alkynyl group, an allyloxy group, an amino group, a hydroxy group, an aryl group or an alkylaryl group.

$R^{f9}$ represents at least one group selected from a —N=P$(OR^{f7})_3$ group, a —N=P$(OR^2)_3$ group, a —N=P(O)OR$^{f7}$ group, and a —N=P(O)OR$^{f8}$ group, and $R^{f10}$ represents at least one group selected from a —P$(OR^{f7})_4$ group, a —P$(OR^{f8})_4$ group, a —P(O)$(OR^{f7})_2$ group, and a —P(O)$(OR^{f8})_2$ group.

Examples of the alkyl groups in formula (FP2) and formula (FP3) include a methyl group, an ethyl group, a propyl group, an isopropyl group, a butyl group, a t-butyl group, a pentyl group, a hexyl group, an octyl group, a decyl group, and a dodecyl group, and an alkyl group having from 1 to 6 carbons, such as a methyl group, an ethyl group, a propyl group, an isopropyl group, a butyl group, a t-butyl group, a pentyl group, or a hexyl group, is preferable, and an alkyl group having from 1 to 4 carbons such as a methyl group, an ethyl group, or a propyl group is more preferable.

Examples of the cycloalkyl groups include cycloalkyl groups having from 5 to 14 carbons, such as a cyclopentyl group and a cyclohexyl group, and cycloalkyl groups having from 5 to 8 carbons are preferable.

Examples of the alkenyl groups include alkenyl groups having from 2 to 8 carbons, such as a vinyl group and an allyl group. Examples of the cycloalkenyl groups include cycloalkenyl groups having from 5 to 12 carbons, such as a cyclopentyl group and a cyclohexyl group.

Examples of the alkynyl groups include alkynyl groups having from 2 to 8 carbons, such as an ethynyl group and a propynyl group, and alkynyl groups having, as a substituent, an aryl group such as an ethynyl benzene group.

Examples of the aryl groups include aiyl groups having from 6 to 20 carbons, such as a phenyl group, a methylphenyl (i. e., tolyl) group, a dimethylphenyl (i. e., xylyl) group, a trimethylphenyl group, and a naphthyl group, and of these, aryl groups having from 6 to 10 carbons are preferable, and a phenyl group is particularly preferable.

Examples of the alkylaryl groups include aralkyl groups having from 6 to 20 carbons, such as a benzyl group, a phenethyl group, and a phenylpropyl group, and of these, aralkyl groups having from 7 to 10 carbons are particularly preferable.

Among these, $R^{f5}$ and $R^{f6}$ in formula (FP2) and $R^{f7}$ and $R^{f8}$ in general formula (FP3) are each preferably an aryl group or an aiylalkyl group, more preferably an aryl group, and even more preferably a phenyl group. The thermal stability of the obtained resin composition can be effectively increased by using such an aromatic phosphazene.

Examples of the cyclic and/or chain-shaped phosphazene compounds represented by formula (FP2) and formula (FP3) include phenoxyphosphazene; (poly)tolyloxyphosphazenes, such as o-tolyloxyphosphazene, m-tolyloxyphosphazene, and p-tolyloxyphosphazene; (poly)xylyloxyphosphazenes, such as o,m-xylyloxyphosphazene, o,p-xylyloxyphosphazene, and m,p-xylyloxyphosphazene; o,m,p-trimethylphenyloxyphosphazene; (poly)phenoxy tolyloxyphosphazenes, such as phenoxy o-tolyloxyphosphazene, phenoxy m-tolyloxyphosphazene, and phenoxy p-tolyloxyphosphazene; (poly)phenoxy tolyloxyxylyloxyphosphazenes, such as phenoxy o,m-xylyloxyphosphazene, phenoxy o,p-xylyloxyphosphazene, and phenoxy m,p-xylyloxyphosphazene, and phenoxy o,m,p-trimethylphenyloxy phosphazene; and cyclic and/or chain-shaped phenoxy phosphazenes are preferable.

As the cyclic phosphazene compound represented by formula (FP2), a cyclic phenoxy phosphazene in which $R^{f5}$ and $R^{f6}$ are phenyl groups is particularly preferable. Examples of such cyclic phenoxy phosphazene compounds include compounds such as phenoxy cyclotriphosphazene, octaphenoxy cyclotetraphosphazene, and decaphenoxy cyclopentaphosphazene, obtained by removing, from a chlorophosphazene mixture of cyclic and chain-shaped chlorophosphazenes obtained by reacting ammonium chloride and phosphorus pentachloride at a temperature from 120 to 130° C., a cyclic chlorophosphazene such as hexachlorocyclo-triphosphazene, octachlorocyclo-tetraphosphazene, or decachlorocyclo-pentaphosphazene, and then substituting with a phenoxy group. Furthermore, the cyclic phenoxy phosphazene compound is preferably a compound in which a in formula (FP2) is an integer from 3 to 8, and may be a mixture of compounds for which a in formula (FP2) is different.

The average of a in formula (FP2) is preferably from 3 to 5 and more preferably from 3 to 4. In addition, of these, the cyclic phenoxy phosphazene compound is preferably a mixture of compounds including 50 mass % or more of compounds for which a=3, from 10 to 40 mass % of compounds for which a=4, and 30 mass % or less altogether of compounds for which a=5 or more.

As the chain-shaped phosphazene compound represented by formula (FP3), a chain-shaped phenoxy phosphazene in which $R^{f7}$ and $R^2$ are phenyl groups is particularly preferable. Examples of such a chain-shaped phenoxy phosphazene compound include a compound obtained by subjecting the hexachlorocyclo-triphosphazene obtained by the method described above to ring-opening polymerization at a temperature from 220 to 250° C., and then substituting the obtained linear dichlorophosphazene having a degree of polymerization from 3 to 10000 with a phenoxy group. Moreover, b in formula (FP3) of the linear phenoxy phosphazene compound is preferably from 3 to 1000, more preferably from 3 to 100, and even more preferably from 3 to 25.

Examples of the crosslinked phosphazene compound include compounds having a crosslinked structure of a 4,4'-diphenylene group, such as a compound having a crosslinked structure of 4,4'-sulfonyldiphenylene (that is, a bisphenol S residue), a compound having a crosslinked structure of a 2,2-(4,4'-diphenylene)isopropylidene group, a compound having a crosslinked structure of a 4,4'-oxydiphenylene group, and a compound having a crosslinked structure of a 4,4'-thiodiphenylene group.

Furthermore, as the crosslinked phosphazene compound, a crosslinked phenoxyphosphazene compound obtained by crosslinking, through an abovementioned crosslinking group, a cyclic phenoxyphosphazene compound in which $R^{f7}$ and $R^{f8}$ in formula (FP3) are phenyl groups, or a crosslinked phenoxyphosphazene compound obtained by crosslinking, through a crosslinking group described above, a chain-shaped phenoxyphosphazene compound in which $R^{f7}$ and $R^{f8}$ in formula (FP3) are phenyl groups is preferable from the perspective of flame retardancy, and a crosslinked phenoxyphosphazene compound obtained by crosslinking a cyclic phenoxyphosphazene compound through a crosslinking group described above is more preferable.

Furthermore, the content of the phenylene group in the crosslinked phenoxyphosphazene compound is ordinarily from 50 to 99.9%, and preferably from 70 to 90%, based on the total number of phenyl groups and phenylene groups in the cyclic phosphazene compound represented by formula (FP2) and/or the chain-shaped phenoxyphosphazene compound represented by formula (FP3). Further, the crosslinked phenoxyphosphazene compound is particularly preferably a compound not having a free hydroxyl group within the molecule thereof.

From the perspectives of flame retardancy and mechanical properties of the resin composition, in the present embodiment, the phosphazene compound is preferably at least one selected from the group including a cyclic phenoxyphosphazene compound represented by formula (FP2) and a crosslinked phenoxyphosphazene compound in which the cyclic phenoxyphosphazene compound represented by formula (FP2) is crosslinked by a crosslinking group.

An example of a commercially available product of a phosphazene compound includes FP-110, available from Fushimi Pharmaceutical Co., Ltd.

The halogen-based flame retardant is preferably a bromine-based flame retardant or a chlorine-based flame retardant, and is more preferably a bromine-based flame retardant.

Examples of bromine-based flame retardants include hexabromocyclododecane, decabromodiphenyloxide, octabromodiphenyloxide, tetrabromobisphenol A, bis(tribromophenoxy)ethane, bis(pentabromophenoxy)ethane, tetrabromobisphenol A epoxy resin, tetrabromobisphenol A carbonate, ethylene(bis-tetrabromophthal)imide, ethylene bispentabromodiphenyl, tris(tribromophenoxy)triazine, bis(dibromopropyl)tetrabromobisphenol A, bis(dibromopropyl)tetrabromobisphenol S, brominated polyphenylene ethers (including poly(di)bromophenylene ether), brominated polystyrenes (polydibromostyrene, polytribromostyrene, and crosslinked brominated polystyrene, and brominated polycarbonates.

The organic metal salt-based flame retardant is preferably an organic alkali metal salt compound or an organic alkaline earth metal salt compound (hereinafter, alkali metals and alkaline earth metals are referred to as "alkali (earth) metals)". Examples of the organic metal salt-based flame retardant include metal sulfonates, metal carboxylate, metal borates, and metal phosphates, but from the perspective of thermal stability when added to an aromatic polycarbonate resin, the organic metal salt-based flame retardant is preferably a metal sulfonate, and a metal perfluoroalkane sulfonate is particularly preferable.

Examples of metal sulfonates include lithium (Li) sulfonates, sodium (Na) sulfonates, potassium (K) sulfonates, rubidium (Rb) sulfonates, cesium (Cs) sulfonates, magnesium (Mg) sulfonates, calcium (Ca) sulfonates, strontium (Sr) sulfonates, and barium (Ba) sulfonates, and of these, sodium (Na) sulfonates and potassium (K) sulfonates are particularly preferable.

Specific examples of such metal sulfonates include aromatic alkali (earth) metal sulfonate compounds, such as dipotassium diphenylsulfon-3,3'-disulfonate, potassium diphenylsulfon-3-sulfonate, sodium benzene sulfonate, sodium (poly)styrene sulfonate, sodium para-toluene sulfonate, sodium (branched) dodecylbenzene sulfonate, sodium trichlorobenzene sulfonate, potassium benzene sulfonate, potassium styrene sulfonate, potassium (poly) styrene sulfonate, potassium para-toluene sulfonate, potassium (branched) dodecylbenzene sulfonate, potassium trichlorobenzene sulfonate, cesium benzene sulfonate, cesium (poly)styrene sulfonate, cesium para-toluene sulfonate, cesium (branched) dodecylbenzene sulfonate, and cesium trichlorobenzene sulfonate; and metal perfluoroalkane sulfonates (the number of carbons of the alkane is preferably from 2 to 6) such as alkali metal perfluoroalkane sulfonates such as potassium perfluorobutane sulfonate. Of these, in particular, dipotassium diphenylsulfon-3,3'-disulfonate, potassium diphenylsulfon-3-sulfonate, sodium para-toluene sulfonate, potassium para-toluene sulfonate, and potassium perfluorobutane sulfonate exhibit an excellent balance between transparency and flame retardancy and are therefore preferable, and metal perfluoroalkane sulfonates such as potassium perfluorobutane sulfonate are particularly preferable.

When the resin composition according to the present embodiment contains a flame retardant, the content of the flame retardant is preferably 0.01 parts by mass or more, more preferably 1 part by mass or more, even more preferably 5 parts by mass or more, particularly preferably 6 parts by mass or more, and even more preferably 7 parts by mass or more, per 100 parts by mass of the polyamide resin. In addition, the content of the flame retardant is also more preferably 50 parts by mass or less, even more preferably 40 parts by mass or less, particularly preferably 35 parts by mass or less, and still even more preferably 30 parts by mass or less, per 100 parts by mass of the polyamide resin.

The resin composition of the present embodiment may contain only a single flame retardant, or may contain two or types of flame retardants. When two or more types of flame retardants are contained, the total amount thereof is preferably in the above range.

Flame Retardant Aid

The resin composition of the present embodiment may contain a flame retardant aid.

Examples of flame retardant aids include antimony-based compounds, zinc stannate, copper oxide, magnesium oxide, zinc oxide, molybdenum oxide, zirconium oxide, tin oxide, iron oxide, titanium oxide, aluminum oxide, and zinc borate, and antimony-based compounds and zinc stannate are preferable. In particular, zinc stannate is preferable when a phosphorus-based flame retardant is used, and an antimony-based compound is preferable when a halogen-based flame retardant is used.

The zinc stannate is preferably at least either one of tin zinc oxide ($ZnSnO_3$) and tin zinc hydroxide ($ZnSn(OH)_6$).

The antimony-based compound is a compound that contains antimony and contributes to flame retardancy. Specific examples include antimony oxides, such as antimony trioxide ($Sb_2O_3$), antimony tetraoxide, and antimony pentoxide ($Sb_2O_5$), and sodium antimonate and antimony phosphate. Among these, the antimony oxides exhibit excellent moisture resistance and thus are preferable. The use of antimony trioxide is particularly preferable.

The content of the flame retardant aid is preferably such that a ratio (mass ratio) of the flame retardant to the flame retardant aid (flame retardant:flame retardant aid) is from 1:0.05 to 1:2.0, and is more preferably such that the ratio is from 1:0.2 to 1:1.0.

The resin composition of the present embodiment may contain only one type of flame retardant aid or may contain two or more types thereof. When two or more types of flame retardant aids are contained, the total amount thereof is preferably in the above range.

Reinforcing Material (Filler)

The resin composition of the present embodiment may contain a reinforcing material, and the resin composition preferably contains a reinforcing material at a percentage from 5.0 to 60.0 mass %.

The type of reinforcing material that can be used in the present embodiment is not particularly specified, and the reinforcing material may be any type, such as fibers, a filler, flakes, or beads, but fibers are preferable.

When the reinforcing material is fibers, the fibers may be short fibers or long fibers.

When the reinforcing material is short fibers or a filler or beads, etc., examples of the form of the resin composition of the present embodiment include pellets, powdered pellets, and a film formed from the pellets.

When the reinforcing material is long fibers, examples of the reinforcing material include long fibers for a so-called, uni-directional (UD) material, and sheet-like long fibers such as a woven or knitted fabric. When these long fibers are used, a sheet-shaped resin composition (for example, a prepreg) can be formed by impregnating the components other than the reinforcing material of the resin composition of the present embodiment into the reinforcing material, which is long fibers formed into a sheet shape.

Examples of the raw material of the reinforcing material include inorganic materials such as glass, carbon (carbon fibers, etc.), alumina, boron, ceramic, metal (steel, etc.), asbestos, clay, zeolite, potassium titanate, barium sulfate, titanium oxide, silicon oxide, aluminum oxide, and magnesium hydroxide, and organic materials such as plants (including, for example, kenaf and bamboo), aramid, polyoxymethylene, aromatic polyamides, polyparaphenylene benzobisoxazole, and ultra-high molecular weight polyethylene, and of these, glass is preferable.

The resin composition of the present embodiment preferably contains glass fibers as the reinforcing material.

The glass fibers are selected from glass compositions such as A glass, C glass, E glass, R glass, D glass, M glass, and S glass, and E glass (non-alkaline glass) is particularly preferable.

The term glass fiber refers to a fibrous material having a perfect circular or polygonal cross-sectional shape when the glass fiber is cut at an angle perpendicular to the length direction. The number average fiber diameter of a single glass fiber is usually from 1 to 25 µm, and preferably from 5 to 17 µm. Moldability of the resin composition tends to improve when the number average fiber diameter is set to 1 µm or more. In addition, the appearance of the obtained molded body and the reinforcing effect tend to improve by setting the number average fiber diameter to 25 µm or less. The glass fiber may be a single fiber or a fiber obtained by intertwining a plurality of single fibers.

The form of the glass fiber may be any of a glass roving in which a single fiber or a plurality of intertwined single fibers are continuously wound, chopped strands cut to uniform lengths from 1 to 10 mm (namely, glass fibers having a number average fiber length from 1 to 10 mm), or milled fibers crushed to an approximate length from 10 to 500 µm (namely, glass fibers having a number average fiber length from 10 to 500 µm), and chopped strands cut to uniform lengths from 1 to 10 mm are preferable. Glass fibers of different forms may be used in combination.

Also, the glass fiber preferably has an irregular cross-sectional shape. In this irregular cross-sectional shape, the flatness represented by the major axis/minor axis ratio of a cross-section perpendicular to the length direction of the fiber is, for example, from 1.5 to 10, preferably from 2.5 to 10, more preferably from 2.5 to 8, and particularly preferably from 2.5 to 5.

As long as the characteristics of the resin composition of the present embodiment are not significantly impaired, the glass fiber may be, for example, a glass fiber that has been oxidized or a glass fiber that has been surface treated with a silane-based compound, an epoxy-based compound, a urethane-based compound, or the like in order to improve affinity with the resin component.

The reinforcing material used in the present embodiment may be a reinforcing material having electrical conductivity. Specific examples of such reinforcing materials include metals, metal oxides, conductive carbon compounds, and conductive polymers, and conductive carbon compounds are preferable.

Examples of the metal include those formed from copper, nickel, silver, and stainless steel, and a metal filler, stainless steel fibers, and a magnetic filler are preferable. Examples of the metal oxide include alumina and zinc oxide, and alumina fibers and zinc oxide nanotubes are preferable. The conductive carbon compound is preferably carbon black, Ketjen carbon, graphene, graphite, fullerenes, carbon nanocoils, carbon nanotubes, or carbon fibers, and is more preferably carbon nanotubes.

Fibers coated with a metal, a metal compound, or a conductive carbon compound are also preferable. Examples thereof include metal-coated fibers and potassium titanate whiskers coated with carbon.

For details on the other reinforcing materials, refer to the disclosure in paragraphs [0033] to [0041] of JP 2021-031633 A, the contents of which are incorporated in the present description.

When the resin composition according to the present embodiment contains a reinforcing material (preferably glass fibers), the content of the reinforcing material is preferably 10 parts by mass or more, more preferably 20 parts by mass or more, even more preferably 30 parts by mass or more, and still even more preferably 40 parts by mass or more, per 100 parts by mass of the polyamide resin. The mechanical strength of the obtained molded body tends to further improve by setting the content of the reinforcing material to equal to or more than the lower limit described above. The content of the reinforcing material (preferably glass fibers) is also preferably 100 parts by mass or less, more preferably 90 parts by mass or less, even more preferably 85 parts by mass or less, yet even more preferably 80 parts by mass or less, and still even more preferably 75 parts by mass or less, per 100 parts by mass of the polyamide resin. Setting the content of the reinforcing material to equal to or less than the upper limit described above tends to improve the appearance of the molded body and further improve the fluidity of the resin composition.

The resin composition in the present embodiment may contain only a single type of reinforcing material (preferably glass fibers), or may contain two or more types. When two or more types of reinforcing materials are contained, the total amount thereof is preferably in the above range.

Nucleator

The resin composition of the present embodiment may contain a nucleator. The inclusion of a nucleator can accelerate the crystallization rate.

The nucleator is not particularly limited as long as it remains unmelted during melt processing and can become a nucleus of a crystal in a cooling process, and may be an organic nucleator or an inorganic nucleator, but is preferably an inorganic nucleator. Examples of inorganic nucleators include graphite, molybdenum disulfide, barium sulfate, talc, calcium carbonate, sodium phosphate, mica and kaolin. The inorganic nucleator is more preferably at least one type selected from talc and calcium carbonate, and talc is even more preferable.

The organic nucleator is not particularly limited, and a known nucleator can be used. For example, the nucleator is preferably at least one type selected from a dibenzylidene sorbitol-based nucleator, a nonitol-based nucleator, a phosphate-based nucleator, a rosin-based nucleator, or a metal benzoate-based nucleator.

The lower limit of the number average particle size of the nucleator is preferably 0.1 μm or higher. In addition, the upper limit of the number average particle size of the nucleator is preferably 40 m or less, more preferably 30 μm or less, even more preferably 28 μm or less, still more preferably 15 μm or less, and yet even more preferably 10 μm or less. When the number average particle size is set to 40 μm or less, the number of nucleators that become nuclei increases in proportion to the blended amount of the nucleator, and thus the crystal structure tends to be more stable.

In addition, the content of the nucleator in the resin composition of the present embodiment is, per 100 parts by mass of the polyamide resin, more than 0.01 parts by mass, preferably 0.05 parts by mass or more, more preferably 0.1 parts by mass or more, even more preferably 0.3 parts by mass or more, and yet even more preferably 0.7 parts by mass or more. The crystal state of the resin composition can be more sufficiently stabilized by setting the content of the nucleator to equal to or more than the lower limit described above. Also, per 100 parts by mass of polyamide resin, the content of the nucleator in the resin composition of the present embodiment is 10 parts by mass or less, preferably 5 parts by mass or less, and more preferably 3 parts by mass or less, and may be 2 parts by mass or less.

When the resin composition of the present embodiment contains a nucleator, the resin composition may contain only a single type of nucleator, or may contain two or more types of nucleators. When two or more types of nucleators are contained, the total amount thereof is preferably in the above range.

Mold Release Agent

The resin composition of the present embodiment may contain a mold release agent.

Examples of mold release agents include aliphatic carboxylic acids, salts of aliphatic carboxylic acids, esters of aliphatic carboxylic acids and alcohols, aliphatic hydrocarbon compounds having a number average molecular weight from 200 to 15000, polysiloxane-based silicone oils, ketone waxes, and light amides. Aliphatic carboxylic acids, salts of aliphatic carboxylic acids, and esters of aliphatic carboxylic acids and alcohols are preferable, and salts of aliphatic carboxylic acids are more preferable.

For details on the mold release agent, refer to the disclosures in paragraphs [0055] to [0061] of JP 2018-095706 A, the contents of which are incorporated herein.

When the resin composition of the present embodiment contains a mold release agent, the content of the mold release agent in the resin composition is preferably from 0.05 to 3 mass %, more preferably from 0.1 to 0.8 mass %, and even more preferably from 0.2 to 0.6 mass %.

The resin composition of the present embodiment may include only one type of mold release agent, or may include two or more types thereof. When two or more types of mold release agents are contained, the total amount thereof is preferably in the above range.

Method for Producing Resin Composition

The method for producing the resin composition of the present embodiment is not particularly specified, and a well-known method for producing a thermoplastic resin composition can be widely adopted. Specifically, the resin composition can be produced by premixing each component using various mixing machines, such as a tumbler and a Henschel mixer, and then melt-kneading the components using, for example, a Banbury mixer, a roll, a Brabender, a single-screw extruder, a twin-screw extruder, or a kneader.

In addition, the resin composition of the present embodiment can also be produced by, for example, not mixing the components in advance or mixing only some of the components in advance, feeding the components into an extruder using a feeder, and then melt-kneading the components. Furthermore, the resin composition of the present embodiment can also be produced by, for example, mixing some of the components in advance and feeding the mixture into an extruder to melt-knead the mixture and obtain a resin composition as a master batch, and then mixing the master batch again with the remaining components and melt-kneading the mixture.

Molded Article

A molded article is formed from the polyamide resin of the present embodiment or the resin composition of the present embodiment.

The method for molding the molded article is not particularly limited, and well-known molding methods can be adopted. Examples thereof include an injection molding method, an injection-compression molding method, an extrusion molding method, a profile extrusion method, a transfer molding method, a hollow molding method, a gas-assisted hollow molding method, a blow molding method, extrusion blow molding, an in-mold coating (IMC) molding method, a rotary molding method, a multi-layer molding method, a two-color molding method, an insert molding method, a sandwich molding method, a foaming molding method, a pressure molding method, stretching, and vacuum molding.

Examples of molded articles formed from the composition of the present embodiment include injection molded articles, thin-wall molded articles, hollow molded articles, films (including plates and sheets), cylindrical molded articles (hoses, tubes, etc.), ring-shaped molded articles, circular molded articles, elliptical molded articles, gear-shaped molded articles, polygonal-shaped molded articles, irregular shaped molded articles, hollow articles, frame-shaped molded articles, box-shaped molded articles, panel-shaped extrusion molded articles, and fibers.

The polyamide resin or polyamide resin composition of the present embodiment is further preferably used as the following materials.

For example, the polyamide resin or polyamide resin composition of the present embodiment is used as a prepreg in which the polyamide resin or the polyamide resin composition of the present embodiment is impregnated in a reinforcing material described above (particularly, reinforcing fibers, preferably carbon fibers or glass fibers); a mixed fiber yarn, a braided yarn, or a twisted yarn containing, as a fiber component, continuous reinforcing fibers and continuous thermoplastic resin fibers containing the polyamide resin or polyamide resin composition of the present embodiment; a woven fabric or knitted fabric in which continuous reinforcing fibers and continuous thermoplastic resin fibers containing the polyamide resin or polyamide resin composition of the present embodiment are used; and a nonwoven fabric including reinforcing fibers and thermoplastic resin fibers containing the polyamide resin or the polyamide resin composition of the present embodiment.

The molded articles can be used in films, sheets, tubes, pipes, gears, cams, various housings, rollers, impellers, bearing retainers, spring holders, clutch parts, chain tensioners, tanks, wheels, connectors, switches, sensors, sockets, capacitors, hard disk parts, jacks, fuse holders, relays, coil bobbins, resistors, IC housings, LED reflectors, intake pipes, blow-by tubes, 3D printer base materials, automotive parts such as automobile interior and exterior components, engine room parts, cooling system parts, sliding parts, and electrical components, surface-mounted components such as electrical and electronic components, surface-mounted type connectors, sockets, camera modules, power supply parts, switches, sensors, capacitor seat plates, hard disk parts, relays, resistors, fuse holders, coil bobbins, and IC housings, and fuel system components such as fuel caps, fuel tanks, fuel sender modules, fuel cutoff valves, canisters, and fuel piping. Specifically, the fuel system components can be suitable used in various types of equipment provided with an engine that uses a fuel such as gasoline or light oil, examples of the equipment thereof including automobiles, tractors, cultivators, weedwackers, lawnmowers, and chainsaws. For details of the fuel system components, reference can be made to the disclosures in paragraphs [0057] to [0061] of WO 2012/098840, the contents of which are incorporated in the present description by reference.

EXAMPLES

The present invention will be described more specifically with reference to examples below. Materials, amounts used, proportions, processing details, processing procedures, and the like described in the following examples can be appropriately changed as long as they do not depart from the spirit of the present invention. Thus, the scope of the present invention is not limited to the specific examples described below.

If a measuring device used in the examples is not readily available due to discontinuation or the like, another device with equivalent performance can be used for measurement.

Raw Materials p-BDEA: p-benzenediethanamine, synthesized according to the following synthesis example.

p-BDEA Synthesis Example

The p-benzenediethanamine was obtained by reducing p-xylylene dicyanide (available from Tokyo Chemical Industry Co., Ltd.) under a hydrogen atmosphere and then distilling and purifying the obtained product. The obtained p-benzenediethanamine was analyzed by gas chromatography, and the results indicated a purity of 99.7%.

p-BDEA-4Me: Organic synthesis was carried out in accordance with the description of Example 3 of JP 2004-503527 T, and an obtained hydrochloride of p-BDEA-4Me was neutralized, after which p-BDEA-4Me was extracted, the resulting extract was purified by distillation, and the following compound was obtained. The obtained p-BDEA-4Me compound was analyzed by gas chromatography, and the results indicated a purity of 99.7%.

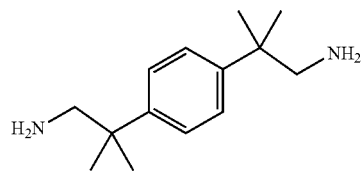 [SMILES: CC(C)(CN)c1ccc(C(C)(C)CN)cc1]

p-BDEA-2 Me: Organic synthesis was carried out in accordance with the description of Example 1 of JP 2004-503527 T, and an obtained hydrochloride of p-BDEA-2Me was neutralized, after which p-BDEA-2Me was extracted, the resulting extract was purified by distillation, and p-BDEA-2Me (the following compound) was obtained. The obtained p-BDEA-2Me was analyzed by gas chromatography, and the results indicated a purity of 94.6%. The compound was also analyzed through neutralization titration using dilute hydrochloric acid, and the results indicated an amino group concentration of 10.35 mmol/g. The obtained p-BDEA-2Me was adjusted so as to be the compounded amount described in Table 1, and the adjusted compound was used.

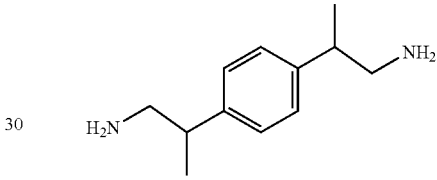

Isophthalic acid: available from Tokyo Chemical Industry Co., Ltd.

p-PDAA: p-phenylenediacetic acid, available from Tokyo Chemical Industry Co., Ltd.

Calcium hypophosphite: available from Fujifilm Wako Pure Chemical Corporation

Sodium acetate: available from Fujifilm Wako Pure Chemical Corporation

Example 1

Synthesis of Polyamide Resin

A flat bottom test tube was charged with 0.00323 mol (0.5305 g) of p-BDEA, 0.00017 mol (0.0375 g) of p-BDEA-4Me, 0.00340 mol (0.5648 g) of isophthalic acid, and 7.0 g of pure water, after which the test tube was inserted into a reaction vessel having a volume of 20 mL and equipped with a thermometer, a pressure gauge, and a pressure regulating valve. Next, the reaction vessel was sufficiently replaced with nitrogen, and the pressure inside of the reaction vessel was returned to ordinary pressure, after which the pressure regulating valve was closed. The reaction vessel was heated with an aluminum block heater, and the internal pressure and temperature of the reaction vessel were held at 1.9 MPa and 210° C. for 20 minutes, and then held at 2.8 MPa and 230° C. for 40 minutes. Next, while the temperature was increased to 260° C., the pressure regulating valve was opened slightly, and water was removed from the pressure regulating valve while lowering the pressure to ordinary pressure over a period of 30 minutes. Subsequently, while moisture was suitably removed from the pressure regulating valve, the reaction vessel was heated to a temperature of the melting point+10° C. and then held at that temperature for 10 minutes. The reaction vessel was then cooled to room temperature, after which the test tube was removed, and a polyamide resin was obtained.

Measurements of Melting Point (Tm), Glass Transition Temperature (Tg), Cold Crystallization Temperature (Tcc) and Enthalpy Change (ΔH) when Melting The melting point (Tm), the glass transition temperature (Tg), the cold crystallization temperature (Tcc) and the crystallization enthalpy change (ΔH) when melting of the synthesized polyamide resin were measured by differential scanning calorimetry (DSC). The DSC measurements were carried out in accordance with JIS K7121 and K7122. Specifically, a differential scanning calorimeter was used, the synthesized polyamide resin was crushed and placed into a measuring pan of the differential scanning calorimeter, and then heated under a nitrogen atmosphere to a temperature of 20° C. higher than a temperature assumed to be the melting point at a temperature increase rate of 10° C./min. Immediately after the temperature increase was completed, the measurement pan was removed and rapidly cooled by being pressed against dry ice. Measurements were implemented after cooling. The melting point, glass transition temperature (Tg) and cold crystallization temperature (Tcc) were measured by increasing the temperature to around 20° C. higher than the assumed melting point at a temperature increase rate of 10° C./min, then maintaining the temperature thereof for 5 minutes, and subsequently reducing the temperature to 100° C. at a temperature decrease rate of −5° C./min.

The "DSC-60" available from Shimadzu Corporation was used as the differential scanning calorimeter.

The melting point (Tm) was expressed in units of ° C., the glass transition temperature (Tg) was expressed in units of ° C., the cold crystallization temperature (Tcc) was express in units of ° C., and the enthalpy change (ΔH) when melting was expressed in units of J/g.

Mass Loss Rate

The mass loss rate of the obtained polyamide resin (in a powdered state) was measured by thermogravimetric analysis.

The obtained polyamide resin was placed in a measurement pan of a thermogravimetric analyzer and heated under a nitrogen atmosphere to a temperature of the melting point+25° C. at a temperature increase rate of 10° C./min, followed by heating for 30 minutes. The mass loss rate was calculated from the following equation.

Mass loss rate={[(mass of polyamide resin when heated to melting point−50° C.)−(mass of polyamide resin when heated for 30 minutes at melting point+25° C.)]/(mass of polyamide resin when heated to melting point−50° C.)}×100

The mass loss rate was expressed in units of %.

The "DTG-60" available from Shimadzu Corporation was used as the thermogravimetric analyzer.

Outgassing

Of the components contained in the obtained polyamide resin, components having a low molecular weight, and particularly cyclic compounds (cyclic monomers) in which one molecule each of a diamine and a dicarboxylic acid are formed, easily volatilize during molding, and thus outgassing tends to easily occur. Therefore, to evaluate the outgassing of the polyamide resin, the amount of cyclic monomers was measured by gel permeation chromatography (GPC).

The "HLC-8320 GPC" available from Tosoh Corporation was used as a GPC analyzer. The TSKgel SuperHM-H (available from Tosoh Corporation) was used as the column, hexafluoroisopropanol (sodium trifluoroacetate 2 mmol/L solution) was used as the solvent, and PMMA was used as the standard substance.

The GPC of the obtained polyamide resin was measured at a temperature of 40° C. and a sample concentration of 0.3 g/L, and the areas of the peaks of the cyclic monomers and higher molecular weight components were measured from the GPC chart of the obtained polyamide resin.

Outgassing={(area of cyclic monomer)/(area of cyclic monomer+area of components having higher molecular weight than the cyclic monomer)}×100

The outgassing was expressed in units of (%). A lower outgassing value indicates that outgassing is less likely to occur.

Examples 2 to 4, 6 and 7, Comparative Example 1

A polyamide resin was synthesized in the same manner as in Example 1 with the exception that the type of diamine and the type of dicarboxylic acid were changed as indicated in Table 1.

Example 5

A polyamide resin was synthesized in the same manner as in Example 1 with the exception that the types of the diamine and dicarboxylic acid were changed as indicated in Table 1, and 0.6 mg of calcium hypophosphite (0.02 mass % as a phosphorus concentration in the polyamide resin) and 0.4 mg of sodium acetate were added in addition to the diamine and dicarboxylic acid.

TABLE 1

| | | Unit | Example 1 | Comparative Example 1 | Example 2 | Example 3 | Example 4 | Example 5 | Example 6 | Example 7 |
|---|---|---|---|---|---|---|---|---|---|---|
| Diamine | p-BDEA | mol % | 95 | 99 | 90 | 95 | 85 | 93 | 95 | 93 |
| | p-BDEA-4Me | mol % | 5 | 1 | 10 | 5 | 15 | 7 | | 7 |
| | p-BDEA-2Me | mol % | | | | | | | 5 | |
| Dicarboxylic acid | Isophthalic acid | mol % | 100 | 100 | 100 | | 100 | 100 | 100 | 100 |
| | p-PDAA | mol % | | | | 100 | | | | |
| Additive | Calcium hypophosphite (in terms of phosphorus) | mass % | | | | | | 0.02 | | |

TABLE 1-continued

| | | Unit | Example 1 | Comparative Example 1 | Example 2 | Example 3 | Example 4 | Example 5 | Example 6 | Example 7 |
|---|---|---|---|---|---|---|---|---|---|---|
| Evaluation | Tm | ° C. | 305 | 315 | 295 | 311 | 304 | 304 | 309 | 304 |
| | Tg | ° C. | 150 | 149 | 150 | 104 | 152 | 152 | 151 | 150 |
| | Tcc | ° C. | 252 | 284 | 220 | 241 | 210 | 251 | 250 | 251 |
| | Tm − Tcc | ° C. | 53 | 31 | 75 | 70 | 94 | 53 | 59 | 53 |
| | ΔH | J/g | 47 | 50 | 22 | 40 | 16 | 45 | 49 | 53 |
| | Mass loss rate | % | 2.2 | 4.8 | 1.7 | 3.9 | 1.9 | 1.5 | 2.9 | 1.9 |
| | Outgassing | % | 0.2 | 0.2 | 0.2 | 5.8 | 0.2 | 0.2 | 0.2 | 0.2 |

As is clear from the results described above, the melting points of the polyamide resins according to the present invention were sufficiently high, and the polyamide resins thereof exhibited excellent thermal resistance. Furthermore, the mass loss rate was low at a temperature 25° C. higher than the melting point, and excellent thermal stability during molding such as injection molding was exhibited. The glass transition temperature was also high. The polyamide resins of the present invention also exhibited an appropriate ΔH. The present invention also excelled in outgassing.

The invention claimed is:

1. A polyamide resin comprising diamine-derived structural units and dicarboxylic acid-derived structural units,
wherein, of the diamine-derived structural units, from 70 to 97 mol % are derived from p-benzenediethanamine and from 3 to 30 mol % are derived from a diamine represented by formula (1), and
50 mol % or more of the dicarboxylic acid-derived structural units are derived from an aromatic dicarboxylic acid:

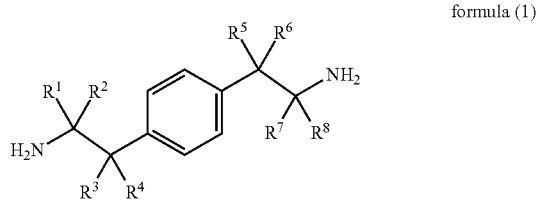

formula (1)

where in formula (1), $R^1$ to $R^8$ each independently represent a hydrogen atom or an aliphatic group having from 1 to 5 carbons, and at least one of $R^1$ to $R^4$ and at least one of $R^5$ to $R^8$ are each an aliphatic group having from 1 to 5 carbons,
wherein 90 mol % or more of the structural units derived from an aromatic dicarboxylic acid are structural units derived from an aromatic dicarboxylic acid selected from isophthalic acid, terephthalic acid, and phenylenediacetic acid.

2. A polyamide resin comprising diamine-derived structural units and dicarboxylic acid-derived structural units,
wherein, of the diamine-derived structural units, from 70 to 97 mol % are derived from p-benzenediethanamine and from 3 to 30 mol % are derived from a diamine represented by formula (1), and
50 mol % or more of the dicarboxylic acid-derived structural units are derived from an aromatic dicarboxylic acid:

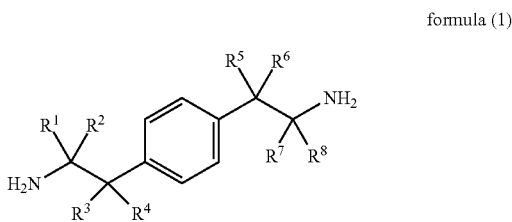

formula (1)

where in formula (1), $R^1$ to $R^8$ each independently represent a hydrogen atom or an aliphatic group having from 1 to 5 carbons, and at least one of $R^1$ to $R^4$ and at least one of $R^5$ to $R^8$ are each an aliphatic group having from 1 to 5 carbons,
wherein 90 mol % or more of the structural units derived from an aromatic dicarboxylic acid are structural units derived from isophthalic acid.

3. The polyamide resin according to claim 1, wherein over 95 mol % of the dicarboxylic acid-derived structural units are structural units derived from an aromatic dicarboxylic acid.

4. The polyamide resin according to claim 1, wherein $R^1$ to $R^8$ in formula (1) each independently represent a hydrogen atom or a methyl group.

5. The polyamide resin according to claim 1, wherein in formula (1), $R^1$, $R^2$, $R^7$ and $R^8$ are hydrogen atoms, and $R^3$, $R^4$, $R^5$ and $R^6$ are methyl groups.

6. The polyamide resin according to claim 1, wherein the polyamide resin has a melting point from 270 to 314° C. as measured according to differential scanning calorimetry.

7. The polyamide resin according to claim 1, wherein an enthalpy change (ΔH) of the polyamide resin when melted as evaluated through differential scanning calorimetry is from 5 to 80 J/g.

8. The polyamide resin according to claim 1, wherein the polyamide resin has a mass loss rate of 4.5% or less at a temperature 25° C. higher than the melting point, as measured according to differential scanning calorimetry.

9. The polyamide resin according to claim 2, wherein $R^1$ to $R^8$ in formula (1) each independently represent a hydrogen atom or a methyl group.

10. The polyamide resin according to claim 2, wherein in formula (1), $R^1$, $R^2$, $R^7$ and $R^8$ are hydrogen atoms, and $R^3$, $R^4$, $R^5$ and $R^6$ are methyl groups.

11. The polyamide resin according to claim 2, wherein the polyamide resin has a melting point from 270 to 314° C. as measured according to differential scanning calorimetry.

12. The polyamide resin according to claim 2, wherein an enthalpy change (ΔH) of the polyamide resin when melted as evaluated through differential scanning calorimetry is from 5 to 80 J/g.

13. The polyamide resin according to claim 1,
wherein over 95 mol % of the dicarboxylic acid-derived structural units are structural units derived from an aromatic dicarboxylic acid;
in formula (1), $R^1$, $R^2$, $R^7$ and $R^8$ are hydrogen atoms, and $R^3$, $R^4$, $R^5$ and $R^6$ are methyl groups;
the polyamide resin has a melting point from 270 to 314° C. as measured according to differential scanning calorimetry;
an enthalpy change ($\Delta H$) of the polyamide resin when melted as evaluated through differential scanning calorimetry is from 5 to 80 J/g; and
the polyamide resin has a mass loss rate of 4.5% or less at a temperature 25° C. higher than the melting point, as measured according to differential scanning calorimetry.

* * * * *